(12) United States Patent
Roseman et al.

(10) Patent No.: US 9,471,670 B2
(45) Date of Patent: *Oct. 18, 2016

(54) NLP-BASED CONTENT RECOMMENDER

(71) Applicant: VCVC III LLC, Seattle, WA (US)

(72) Inventors: Neil Roseman, Seattle, WA (US);
Jisheng Liang, Bellevue, WA (US);
Krzysztof Koperski, Seattle, WA (US);
Korina J. Stark, Bellevue, WA (US);
Navdeep S. Dhillon, Seattle, WA (US);
Diana Schwend, Seattle, WA (US);
Jose Hernando, Seattle, WA (US)

(73) Assignee: VCVC III LLC, Seattle, WA (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/181,591

(22) Filed: Feb. 14, 2014

(65) Prior Publication Data

US 2014/0229467 A1 Aug. 14, 2014

Related U.S. Application Data

(63) Continuation of application No. 12/288,349, filed on Oct. 16, 2008, now Pat. No. 8,700,604.

(60) Provisional application No. 60/999,559, filed on Oct. 17, 2007.

(51) Int. Cl.
*G06F 17/30* (2006.01)
*G06F 17/27* (2006.01)

(52) U.S. Cl.
CPC ....... *G06F 17/30696* (2013.01); *G06F 17/278* (2013.01); *G06F 17/30672* (2013.01); *G06F 17/30734* (2013.01)

(58) Field of Classification Search
CPC combination set(s) only.
See application file for complete search history.

(56) References Cited

U.S. PATENT DOCUMENTS 4,839,853 A   6/1989   Deerwester et al. ......... 364/900
5,301,109 A   4/1994   Landauer et al. ....... 364/419.19

(Continued)

FOREIGN PATENT DOCUMENTS

EP   0 280 866   9/1988
EP   0 597 630   5/1994

(Continued)

OTHER PUBLICATIONS

Molla, Diego, "AFNER—Named Entity Recognition," Macquarie University, Australia, 2008, 2 pages.

(Continued)

*Primary Examiner* — Etienne Leroux
(74) *Attorney, Agent, or Firm* — Ellen M. Bierman; Lowe Graham Jones PLLC

(57) ABSTRACT

Methods, techniques, and systems for using natural language processing to recommend related content to an associated text segment or document. Example embodiments provide a NLP-based content recommender ("NCR") which uses NLP-based search techniques, potentially in conjunction with context or other related information, to locate and provide content related to entities that are recognized in the associated material. NCRs may be embedded as widgets, for example on Web pages to assist users in their perusal and search for information, provided by means of browser plug-ins or other application plug-ins, provided in libraries or in standalone environments, or otherwise integrated into other code, programs, or devices. This abstract is provided to comply with rules requiring an abstract, and it is submitted with the intention that it will not be used to interpret or limit the scope or meaning of the claims.

19 Claims, 33 Drawing Sheets

(56) References Cited

U.S. PATENT DOCUMENTS

| | | | |
|---|---|---|---|
| 5,317,507 A | 5/1994 | Gallant | 364/419.13 |
| 5,325,298 A | 6/1994 | Gallant | 364/419.19 |
| 5,331,556 A | 7/1994 | Black, Jr. et al. | 364/419.08 |
| 5,377,103 A | 12/1994 | Lamberti et al. | 364/419.08 |
| 5,619,709 A | 4/1997 | Caid et al. | 395/794 |
| 5,634,051 A | 5/1997 | Thomson | 395/605 |
| 5,752,022 A * | 5/1998 | Chiu | G06F 17/30905 |
| 5,778,362 A | 7/1998 | Deerwester | 707/5 |
| 5,794,050 A | 8/1998 | Dahlgren et al. | 395/708 |
| 5,794,178 A | 8/1998 | Caid et al. | 704/9 |
| 5,799,268 A | 8/1998 | Boguraev | 704/9 |
| 5,848,417 A | 12/1998 | Shoji et al. | 707/102 |
| 5,857,179 A | 1/1999 | Vaithyanathan et al. | 707/2 |
| 5,884,302 A | 3/1999 | Ho | 707/3 |
| 5,933,822 A | 8/1999 | Braden-Harder et al. | 707/5 |
| 5,950,189 A | 9/1999 | Cohen et al. | 707/3 |
| 5,982,370 A | 11/1999 | Kamper | 345/356 |
| 6,006,221 A | 12/1999 | Liddy et al. | 707/5 |
| 6,006,225 A | 12/1999 | Bowman et al. | 707/5 |
| 6,026,388 A | 2/2000 | Liddy et al. | 707/1 |
| 6,061,675 A | 5/2000 | Wical | 706/45 |
| 6,064,951 A | 5/2000 | Park et al. | 704/8 |
| 6,122,647 A | 9/2000 | Horowitz et al. | 707/513 |
| 6,167,368 A | 12/2000 | Wacholder | 704/9 |
| 6,178,416 B1 | 1/2001 | Thompson et al. | 707/3 |
| 6,185,550 B1 | 2/2001 | Snow et al. | 707/1 |
| 6,192,360 B1 | 2/2001 | Dumais et al. | 707/6 |
| 6,202,064 B1 | 3/2001 | Julliard | 707/5 |
| 6,219,664 B1 | 4/2001 | Watanabe | 707/3 |
| 6,246,977 B1 | 6/2001 | Messerly et al. | 704/9 |
| 6,311,152 B1 | 10/2001 | Bai et al. | 704/9 |
| 6,363,373 B1 | 3/2002 | Steinkraus | 707/3 |
| 6,405,190 B1 | 6/2002 | Conklin | 707/3 |
| 6,411,962 B1 | 6/2002 | Kupiec | 707/102 |
| 6,460,029 B1 | 10/2002 | Fries et al. | 707/3 |
| 6,484,162 B1 | 11/2002 | Edlund et al. | 707/3 |
| 6,510,406 B1 | 1/2003 | Marchisio | 704/9 |
| 6,571,236 B1 | 5/2003 | Ruppelt | 707/3 |
| 6,584,464 B1 | 6/2003 | Warthen | 707/4 |
| 6,601,026 B2 | 7/2003 | Appelt et al. | 704/9 |
| 6,631,523 B1 * | 10/2003 | Matthews, III | H04N 5/44543 348/E5.105 |
| 6,728,707 B1 | 4/2004 | Wakefield et al. | 707/5 |
| 6,732,097 B1 | 5/2004 | Wakefield et al. | 707/5 |
| 6,732,098 B1 | 5/2004 | Wakefield et al. | 707/5 |
| 6,738,765 B1 | 5/2004 | Wakefield et al. | 707/5 |
| 6,741,988 B1 | 5/2004 | Wakefield et al. | 707/7 |
| 6,745,161 B1 | 6/2004 | Arnold et al. | 704/7 |
| 6,757,646 B2 | 6/2004 | Marchisio | 704/8 |
| 6,859,800 B1 | 2/2005 | Roche et al. | 707/3 |
| 6,862,710 B1 | 3/2005 | Marchisio | 715/501.1 |
| 6,904,433 B2 | 6/2005 | Kapitskaia et al. | 707/10 |
| 6,910,003 B1 | 6/2005 | Arnold et al. | 704/4 |
| 6,996,575 B2 | 2/2006 | Cox et al. | 707/102 |
| 7,051,017 B2 | 5/2006 | Marchisio | 707/3 |
| 7,054,854 B1 | 5/2006 | Hattori et al. | 707/3 |
| 7,146,416 B1 | 12/2006 | Yoo et al. | 709/224 |
| 7,171,349 B1 | 1/2007 | Wakefield et al. | 704/9 |
| 7,283,951 B2 | 10/2007 | Marchisio et al. | 704/9 |
| 7,356,778 B2 | 4/2008 | Hooper et al. | 715/841 |
| 7,398,201 B2 | 7/2008 | Marchisio et al. | 704/9 |
| 7,403,938 B2 | 7/2008 | Harrison et al. | 707/3 |
| 7,451,135 B2 | 11/2008 | Goldman et al. | 707/3 |
| 7,526,425 B2 | 4/2009 | Marchisio et al. | 704/9 |
| 7,529,756 B1 | 5/2009 | Haschart et al. | 707/100 |
| 7,672,833 B2 | 3/2010 | Blume et al. | 704/10 |
| 7,752,200 B2 | 7/2010 | Scholl et al. | 707/730 |
| 7,788,084 B2 | 8/2010 | Brun et al. | 704/7 |
| 8,069,160 B2 | 11/2011 | Rao | 707/706 |
| 8,112,402 B2 | 2/2012 | Cucerzan et al. | 707/705 |
| 8,122,016 B1 | 2/2012 | Lamba et al. | 707/723 |
| 8,122,026 B1 | 2/2012 | Laroco, Jr. et al. | 707/737 |
| 8,132,103 B1 | 3/2012 | Chowdhury et al. | 715/723 |
| 8,412,557 B1 | 4/2013 | Lloyd et al. | 705/7.29 |
| 8,666,909 B2 | 3/2014 | Pinckney et al. | 706/11 |
| 8,700,604 B2 * | 4/2014 | Roseman | G06F 17/278 707/716 |
| 8,725,739 B2 | 5/2014 | Liang | 707/40 |
| 2002/0007267 A1 | 1/2002 | Batchilo et al. | 704/9 |
| 2002/0010574 A1 | 1/2002 | Tsourikov et al. | 704/9 |
| 2002/0022956 A1 | 2/2002 | Ukrainczyk et al. | 704/9 |
| 2002/0022988 A1 | 2/2002 | Columbus et al. | 705/11 |
| 2002/0059161 A1 | 5/2002 | Li | 707/1 |
| 2002/0078041 A1 | 6/2002 | Wu | 707/4 |
| 2002/0078045 A1 | 6/2002 | Dutta | 707/7 |
| 2002/0091671 A1 | 7/2002 | Prokoph | 707/1 |
| 2002/0103789 A1 | 8/2002 | Turnbull et al. | 707/3 |
| 2002/0120651 A1 | 8/2002 | Pustejovsky et al. | 707/513 |
| 2002/0156763 A1 | 10/2002 | Marchisio | 707/1 |
| 2003/0004716 A1 | 1/2003 | Haigh et al. | 704/238 |
| 2003/0101182 A1 | 5/2003 | Govrin et al. | 707/7 |
| 2003/0115065 A1 | 6/2003 | Kakivaya et al. | 704/270.1 |
| 2003/0115191 A1 | 6/2003 | Copperman et al. | 707/3 |
| 2003/0191626 A1 | 10/2003 | Al-Onaizan et al. | 704/8 |
| 2003/0233224 A1 | 12/2003 | Marchisio et al. | 704/4 |
| 2004/0010508 A1 | 1/2004 | Fest et al. | 707/102 |
| 2004/0044669 A1 | 3/2004 | Brown et al. | 707/100 |
| 2004/0064447 A1 | 4/2004 | Simske et al. | 707/5 |
| 2004/0103090 A1 | 5/2004 | Dogl et al. | 707/3 |
| 2004/0125877 A1 | 7/2004 | Chang et al. | 375/240.28 |
| 2004/0167870 A1 | 8/2004 | Wakefield et al. | 707/1 |
| 2004/0167883 A1 | 8/2004 | Wakefield et al. | 707/3 |
| 2004/0167884 A1 | 8/2004 | Wakefield et al. | 707/3 |
| 2004/0167885 A1 | 8/2004 | Wakefield et al. | 707/3 |
| 2004/0167886 A1 | 8/2004 | Wakefield et al. | 707/3 |
| 2004/0167887 A1 | 8/2004 | Wakefield et al. | 707/3 |
| 2004/0167907 A1 | 8/2004 | Wakefield et al. | 707/100 |
| 2004/0167908 A1 | 8/2004 | Wakefield et al. | 707/100 |
| 2004/0167909 A1 | 8/2004 | Wakefield et al. | 707/100 |
| 2004/0167910 A1 | 8/2004 | Wakefield et al. | 707/100 |
| 2004/0167911 A1 | 8/2004 | Wakefield et al. | 707/100 |
| 2004/0221235 A1 | 11/2004 | Marchisio et al. | 715/534 |
| 2004/0243388 A1 | 12/2004 | Corman et al. | 704/1 |
| 2005/0027704 A1 | 2/2005 | Hammond et al. | 707/5 |
| 2005/0076365 A1 | 4/2005 | Popov et al. | 725/46 |
| 2005/0108001 A1 | 5/2005 | Aarskog | 704/10 |
| 2005/0108262 A1 | 5/2005 | Fawcett, Jr. et al. | 707/100 |
| 2005/0138018 A1 | 6/2005 | Sakai et al. | 707/3 |
| 2005/0144064 A1 | 6/2005 | Calabria et al. | 705/14 |
| 2005/0149494 A1 | 7/2005 | Lindh et al. | 707/3 |
| 2005/0177805 A1 | 8/2005 | Lynch et al. | 715/968 |
| 2005/0197828 A1 | 9/2005 | McConnell et al. | 704/9 |
| 2005/0210000 A1 | 9/2005 | Michard | 707/3 |
| 2005/0216443 A1 | 9/2005 | Morton et al. | 707/3 |
| 2005/0234879 A1 | 10/2005 | Zeng et al. | 707/3 |
| 2005/0234968 A1 | 10/2005 | Arumainayagam et al. | 707/102 |
| 2005/0262050 A1 | 11/2005 | Fagin et al. | 707/3 |
| 2005/0267871 A1 | 12/2005 | Marchisio et al. | 707/3 |
| 2006/0149734 A1 | 7/2006 | Egnor et al. | 707/7 |
| 2006/0167862 A1 * | 7/2006 | Reisman | G06F 17/30 |
| 2006/0224565 A1 | 10/2006 | Ashutosh et al. | 707/3 |
| 2006/0229889 A1 * | 10/2006 | Hodjat | G06F 9/4443 709/202 |
| 2006/0271353 A1 | 11/2006 | Berkan et al. | 704/9 |
| 2006/0279799 A1 | 12/2006 | Goldman | 358/403 |
| 2007/0067285 A1 | 3/2007 | Blume et al. | 707/5 |
| 2007/0130194 A1 | 6/2007 | Kaiser | 707/102 |
| 2007/0136326 A1 | 6/2007 | McClement et al. | 707/100 |
| 2007/0143300 A1 | 6/2007 | Gulli et al. | 707/10 |
| 2007/0156669 A1 | 7/2007 | Marchisio et al. | 707/4 |
| 2007/0174258 A1 | 7/2007 | Jones et al. | 707/3 |
| 2007/0203901 A1 * | 8/2007 | Prado | G06Q 30/02 |
| 2007/0209013 A1 * | 9/2007 | Ramsey | G06F 17/30893 715/769 |
| 2007/0233656 A1 | 10/2007 | Bunescu et al. | 707/3 |
| 2007/0276830 A1 | 11/2007 | Gruhl et al. | 707/7 |
| 2007/0276926 A1 * | 11/2007 | LaJoie | G06F 21/10 709/219 |
| 2008/0005651 A1 | 1/2008 | Grefenstette et al. | 715/500 |
| 2008/0010270 A1 | 1/2008 | Gross | 707/5 |
| 2008/0059456 A1 | 3/2008 | Chowdhury et al. | 707/5 |
| 2008/0082578 A1 | 4/2008 | Hogue et al. | 707/104.1 |
| 2008/0097975 A1 | 4/2008 | Guay et al. | 707/4 |
| 2008/0097985 A1 | 4/2008 | Olstad et al. | 707/5 |

(56) References Cited

U.S. PATENT DOCUMENTS

| | | | |
|---|---|---|---|
| 2008/0120129 A1 | 5/2008 | Seubert et al. | 705/35 |
| 2008/0208864 A1 | 8/2008 | Cucerzan et al. | 707/8 |
| 2008/0228720 A1 | 9/2008 | Mukherjee et al. | 707/3 |
| 2008/0235203 A1 | 9/2008 | Case et al. | 707/5 |
| 2008/0249986 A1 | 10/2008 | Clarke-Martin et al. | 707/3 |
| 2008/0249991 A1 | 10/2008 | Valz | |
| 2008/0256056 A1 | 10/2008 | Chang et al. | 707/5 |
| 2008/0288456 A1 | 11/2008 | Omoigui | 707/3 |
| 2008/0303689 A1 | 12/2008 | Iverson | 340/825.36 |
| 2008/0306899 A1 | 12/2008 | Gregory et al. | 707/1 |
| 2009/0070325 A1 | 3/2009 | Gabriel et al. | 707/5 |
| 2009/0076886 A1 | 3/2009 | Dulitz et al. | 705/10 |
| 2009/0144609 A1 | 6/2009 | Liang et al. | 715/230 |
| 2009/0187467 A1 | 7/2009 | Fang et al. | 705/10 |
| 2009/0228439 A1 | 9/2009 | Manolescu et al. | 707/3 |
| 2009/0248678 A1 | 10/2009 | Okamoto | 707/5 |
| 2009/0319342 A1 | 12/2009 | Shilman et al. | 705/10 |
| 2009/0327223 A1 | 12/2009 | Chakrabarti et al. | |
| 2010/0010994 A1 | 1/2010 | Wittig et al. | 707/6 |
| 2010/0023311 A1 | 1/2010 | Subrahmanian et al. | 704/2 |
| 2010/0046842 A1 | 2/2010 | Conwell | 382/218 |
| 2010/0048242 A1 | 2/2010 | Rhoads et al. | 455/556.1 |
| 2010/0145940 A1 | 6/2010 | Chen et al. | 707/736 |
| 2010/0250497 A1 | 9/2010 | Redlich et al. | 707/661 |
| 2010/0299301 A1 | 11/2010 | Busch et al. | 706/46 |
| 2010/0299326 A1 | 11/2010 | Germaise | 707/728 |
| 2010/0306251 A1 | 12/2010 | Snell | 707/769 |
| 2011/0112995 A1 | 5/2011 | Chang et al. | 706/12 |
| 2011/0173194 A1 | 7/2011 | Sloo et al. | 707/736 |
| 2012/0254188 A1 | 10/2012 | Koperski et al. | 707/740 |
| 2013/0124510 A1 | 5/2013 | Guha | 707/723 |

FOREIGN PATENT DOCUMENTS

| | | |
|---|---|---|
| KR | 20080111822 | 12/2008 |
| WO | 00/14651 | 3/2000 |
| WO | 00/57302 | 9/2000 |
| WO | 01/22280 | 3/2001 |
| WO | 01/80177 | 10/2001 |
| WO | 02/27536 | 4/2002 |
| WO | 02/33583 | 4/2002 |
| WO | 03/017143 | 2/2003 |
| WO | 2004/053645 | 6/2004 |
| WO | 2004/114163 | 12/2004 |
| WO | 2006/068872 | 6/2006 |

OTHER PUBLICATIONS

Nadeau, David, et al. "A survey of named entity recognition and classification," National Research Council Canada / New York University, Lingvisticae Investigationes, vol. 30, Jan. 1, 2007, 20 pages.

Abraham, "FoXQ—Xquery by Forms," Human Centric Computing Languages and Environments, IEEE Symposium, Oct. 28-31, 2003, Piscataway, New Jersey, pp. 289-290.

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," *Proc. of the 2nd European Symposium on Principles of Data Mining and Knoweldge Discovery*, Nantes, France, 1998, pp. 1-9.

Ilyas et al., "A Conceptual Architecture for Semantic Search Engine," IEEE, INMIC, 2004, pp. 605-610.

Jayapandian et al., "Automating the Design and Construction of Query Forms," Data Engineering, Proceedings of the 22nd International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.

Liang et al., "Extracting Statistical Data Frames from Text," SIGKDD Explorations 7(1):67-75, Jun. 2005.

Littman et al., "Automatic Cross-Language Information Retrieval Using Latent Semantic Indexing," *In Grefenstette, G. editor*, Cross Language Information Retrieval. Kluwer, 1998, pp. 1-11.

Nagao et al., "Semantic Annotation and Transcoding: Making Web Content More Accessible," *IEEE Multimedia, IEEE Computer Society*, US, 8(2):69-81, Apr. 2001.

Nguyen et al., "Accessing Relational Databases from the World Wide Web," SIGMOD Record ACM USA, Jun. 1996, vol. 25, No. 2, pp. 529-540.

Pohlmann et al., "The Effect of Syntactic Phrase Indexing on Retrieval Performance for Dutch Texts," *Proceedings of RIAO*, pp. 176-187, Jun. 1997.

Rasmussen, "WDB—A Web Interface to Sybase," Astronomical Society of the Pacific Conference Series, Astron. Soc. Pacific USA, 1995, vol. 77, pp. 72-75, 1995.

Sneiders, "Automated Question Answering Using Question Templates That Cover the Conceptual Model of the Database," *Natural Language Processing and Information Systems, 6th International Conference on Applications of Natural Language to Information Systems*, Revised Papers (Lecture Notes in Computer Science vol. 2553) Springer-Verlag Berlin, Germany, 2002 vol. 2553, pp. 235-239.

Ruiz-Casado et al., "From Wikipedia to Semantic Relationships: a Semi-Automated Annotation Approach" 2006, pp. 1-14.

Florian et al., "Named Entity Recognition through Classifier Combination", 2003, IBM T.J. Watson Research Center, pp. 168-171.

Wu et al., "A Stacked, Voted, Stacked Model for Named Entity Recognition", 2003, pp. 1-4.

Google "How to Interpret your Search Results", http://web.archive.org/web/2011116075703/http://www.google.com/intl/en/help/interpret/htht, Mar. 27, 2001, 6 pages.

Razvan Bunescu et al., "Using Encyclopedia Knowledge for Named Entity Disambiguation" 2006, Google, pp. 9-16.

Silviu Cucerzan, "Large-Scale Named Entity Disambiguation Based on Wikipedia Data", *Proceedings of the 2007 Joint Conference on Empirical Methods in Natural Language Processing and Computational Natural Language Learning*, Prague, Jun. 2007, pp. 708-716.

Bunescu "Learning for Information Extraction: From Named Entity Recognition and Disambiguation to Relation Extraction", *The Dissertation Committee for Aug. 2007*, The University of Texas at Austin, pp. 1-150.

Hassell et al., "Ontology-Driven Automatic Entity Disambiguation in Unstructured Text", *Large Scale Distributed Information Systems (LSDIS) Lab Computer Science Department*, University of Georgia, Athens, GA 30602-7404, ISWC, 2006, LNCS 4273, pp. 44-57.

Lloyd et al.,"Disambiguation of References to Individuals", IBM Research Report, Oct. 28, 2005, pp. 1-9.

Dhillon et al., "Refining Clusters in High Dimensional Text Data," 2002.

Perone, Christian, Machine Learning:: Cosine Similarity for Vector Space Models (Part III), Pyevolve.sourceforge.net/wordpress/?p=2497, Sep. 12, 2013.

Rao et al., "Entity Linking: Finding Extracted Entities in a Knowledge Base," Jul. 12, 2012, *Multi-source, Multilingual Information Extraction and Summarization Theory and Applications of Natural Language Processing*, 2013, 21 pages.

\* cited by examiner

```
<div class="evri-widget-launcher"><a href="http://www.evri.com/" title="Get content recommendations from Evri">Content recommendations from <em>Evri</em></a></div>
<script type="text/javascript" charset="utf-8" src="http://www.evri.com/widget/javascripts/widget.1.js"></script>
<script type="text/javascript" charset="utf-8">
// For more information on installing this code, visit:
// http://blog.evri.com/index.php/widget-webpage Evri.$(window).ready(function () {
    var documentCSSSelector = 'body';
    var contentCSSSelector = 'h1, p';
    var widget = new Evri.Widget.ContentRecommendation();
    widget.popover();
    widget.placeInvocationPoints(documentCSSSelector, contentCSSSelector, {});
});
</script>
```

501

Installation notes:

- By default, the contentCSSSelector variable is set to pull all the content in h1 and p tags in the body element. The contentCSSSelector variable can be changed to select any content on your page using standard Cascading Stylesheets Selectors.

- By default, the documentCSSSelector variable is set to the body tag of your website. The documentCSSSelector variable should only be changed if you have multiple documents on a page (such as the index page of a blog which could have multiple posts) and you would like to have a separate invocation point for each document on that page.

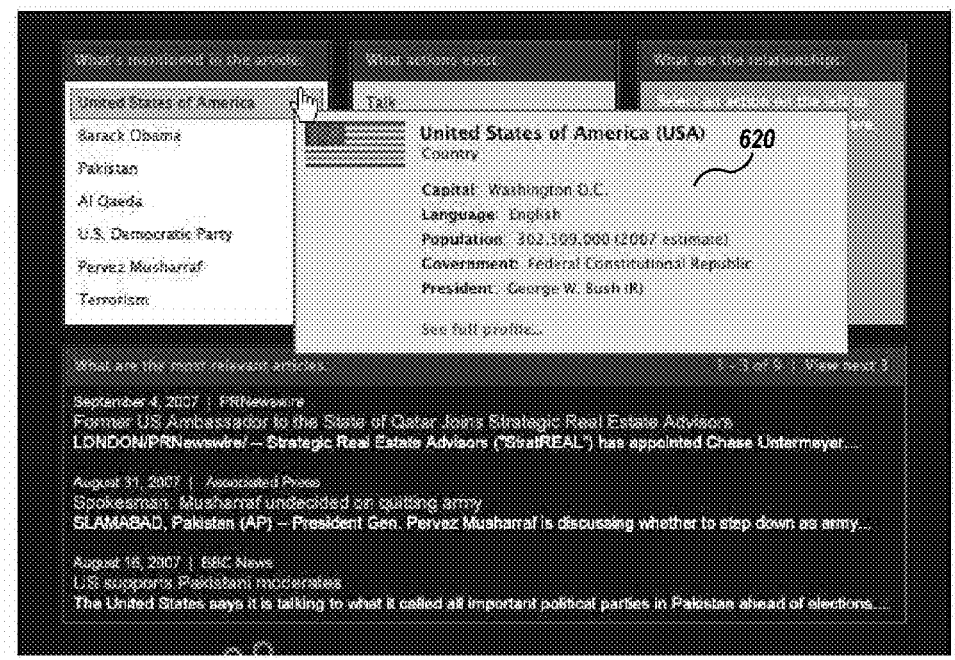
Fig. 6C

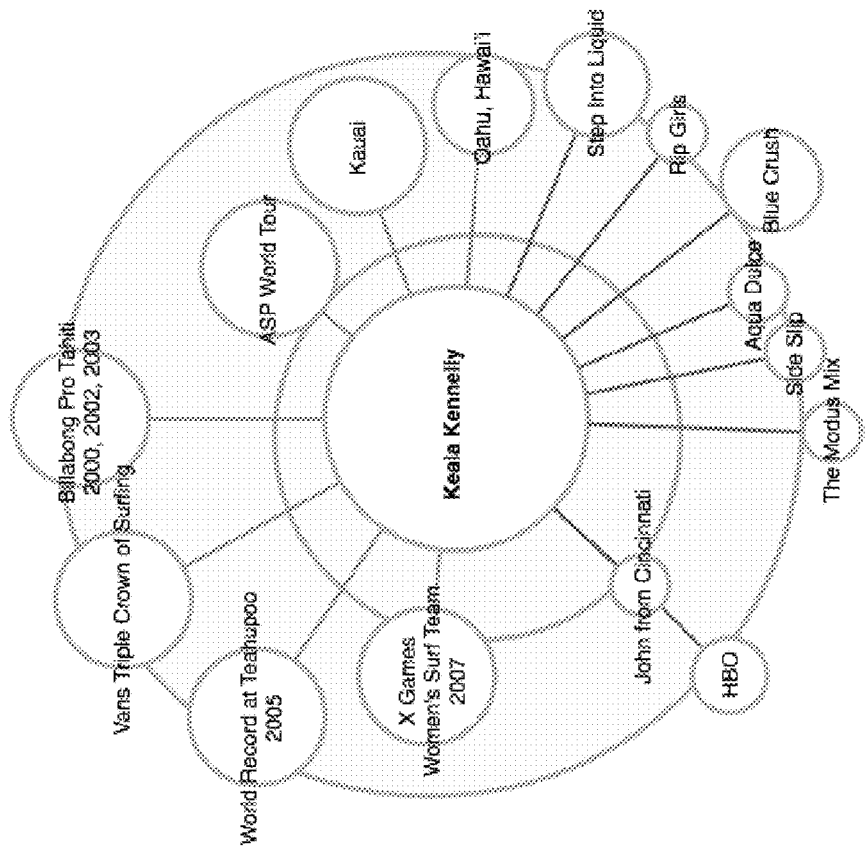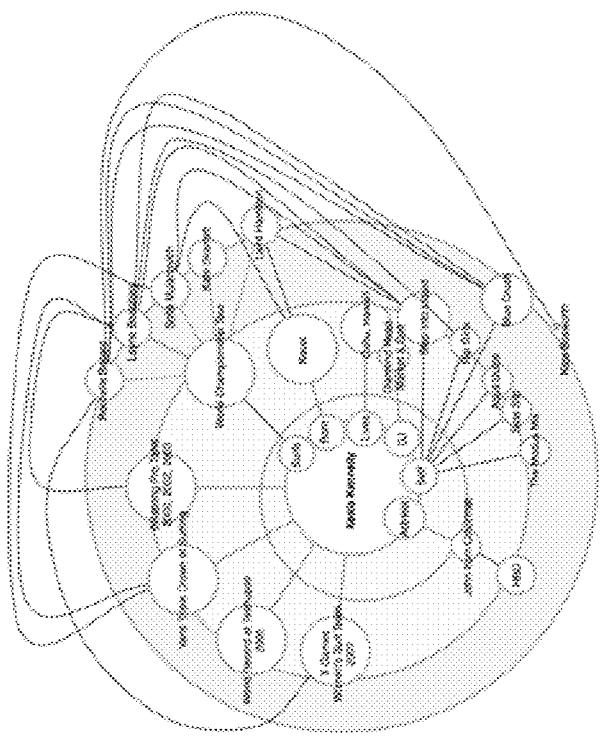
Fig. 9

Fig. 11B

NLP-BASED CONTENT RECOMMENDER

CROSS REFERENCE TO RELATED APPLICATIONS

This application is a continuation of U.S. application Ser. No. 12/288,349, entitled "NLP-BASED CONTENT RECOMMENDER," filed Oct. 16, 2008, now U.S. Pat. No. 8,700,604, which claims the benefit of U.S. Provisional Application No. 60/999,559, entitled "NLP-BASED CONTENT RECOMMENDER," filed Oct. 17, 2007, all of which are incorporated herein in their entireties.

TECHNICAL FIELD

The present disclosure relates to methods, techniques, and systems for presenting content using natural language processing and, in particular, to methods, techniques, and systems for recognizing named entities using natural language processing and presenting content related thereto.

BACKGROUND

With more than 15 billion documents on the World Wide Web (the Web) today, it has become very difficult for users to find desired information or to discover relevant information. Typically, a user engages a keyword (Boolean) based search engine to enter terms that s/he thinks relates to the topic of interest. Unfortunately, there could be hundreds of thousands of documents with similar keywords requiring readers to sort out what is relevant. Moreover, once a user has followed links (e.g., hyperlinks, hypertext, indicators, etc.) to more than a few web pages, it is highly likely that the user has navigated to a point that makes it difficult to retrace steps.

Thus, although the volume of documents on the Web potentially makes a lot more information available to the average person, it takes a fair bit of time to actually find documents that are useful.

BRIEF DESCRIPTION OF THE DRAWINGS

FIG. 1A is an example screen display of an example mechanism for invoking a NLP-Based Content Recommender from a web page displayed in a web browser.

FIG. 1C is an example screen display illustrating the result of selection of one of the named entities in the underlying content.

FIGS. 4A-4C are example screen displays of another type of NLP-Based Content Recommender widget presented adjacent to content.

FIG. 5 is an example code for installing an example embodiment of an NLP-Based Content Recommender in a content creator's Web page.

FIGS. 6A-6D illustrate example screen displays for an example embodiment of an NLP-Based Content Recommender in the form of links to further information.

FIG. 9 is another example screen display of a graphical representation of connections.

FIGS. 11A-11C illustrate another example NCR widget that combines some of the previously described textual and graphical presentations to present related and/or auxiliary information.

DETAILED DESCRIPTION

Embodiments described herein provide enhanced computer- and network-assisted methods, techniques, and systems for using natural language processing techniques, potentially in conjunction with context or other related information, to locate and provide content related to entities that are recognized in associated material. Example embodiments provide one or more NLP-based content recommenders ("NCRs") that each, based upon a natural language analysis of an underlying text segment, determine which entities are being referred to in the text segment and recommend additional content relating to such entities.

NCRs may be useful in environments such as to support a user browsing pages of content on the Web. One or more NCRs may be embedded as widgets on such pages to assist users in their perusal and search for information, provided by means of browser plug-ins or other application plug-ins, provided in libraries or in standalone environments, or otherwise integrated into other code, programs, or devices.

For example, when a news article is being displayed in a Web browser, an NCR may be invoked to suggest additional relevant content by recognizing the entities referred to in the article and determining relevant additional content, organized by a number of factors, for example, by frequency of appearance of other information relating to one of the recognized entities in the article, by knowledge of the browse patterns of the reader, etc. An NCR might also be invoked to allow the reader to explore the top entities "connected" to one of the entities selected from the entities recognized in the news article. Connectedness in this sense refers to entities which are related to the selected recognized entity typically through one or more actions (verbs). Or an NCR might be invoked to "filter" or otherwise rank or order the content presented to the user.

Figure 1A:
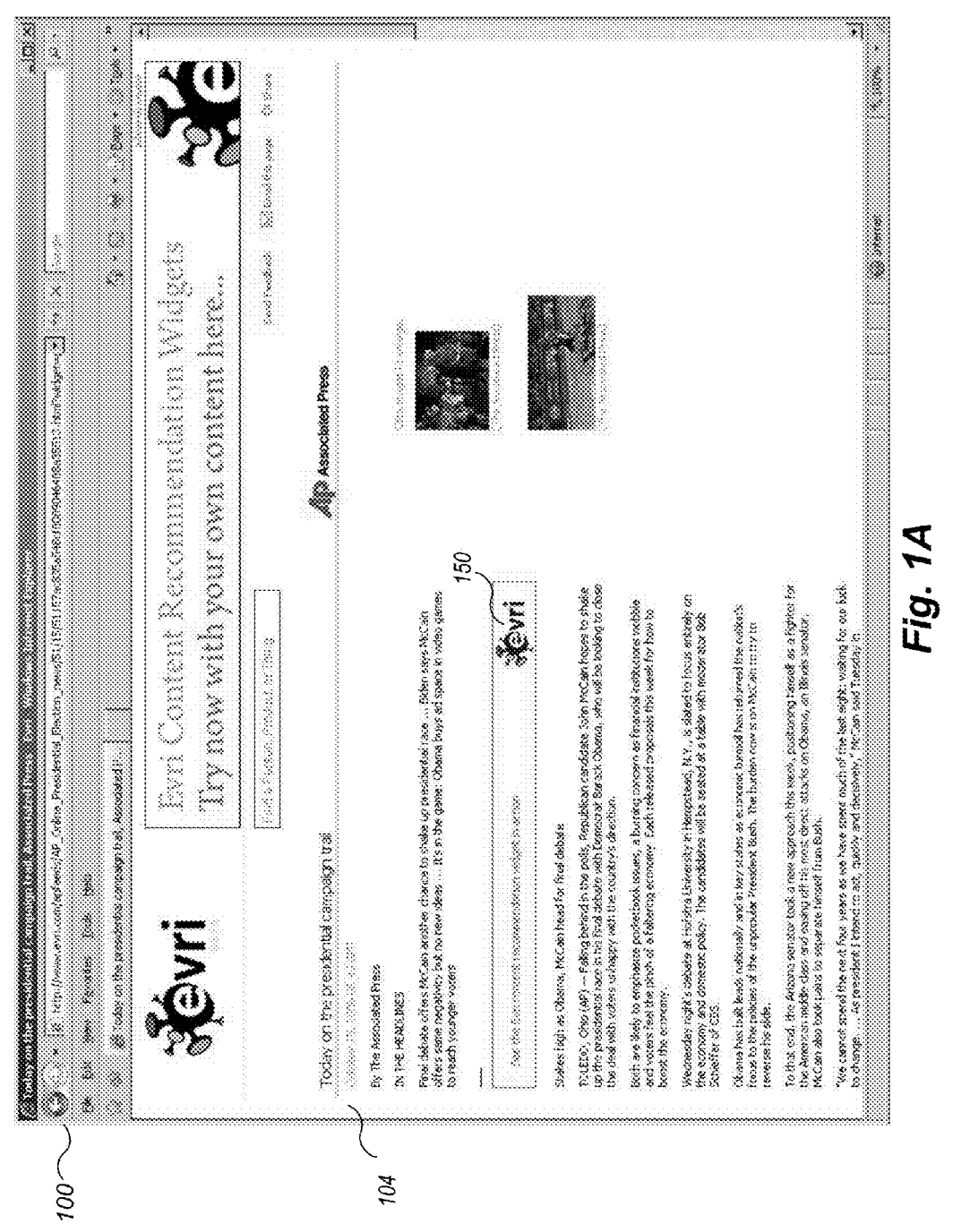

FIG. 1A is an example screen display of an example mechanism for invoking a NLP-Based Content Recommender from a web page displayed in a web browser. In FIG.

1A, web browser 100 is shown displaying news article 104. An icon 150 labeled "Evri" is display for invoking the NCR.

Figure 1B:
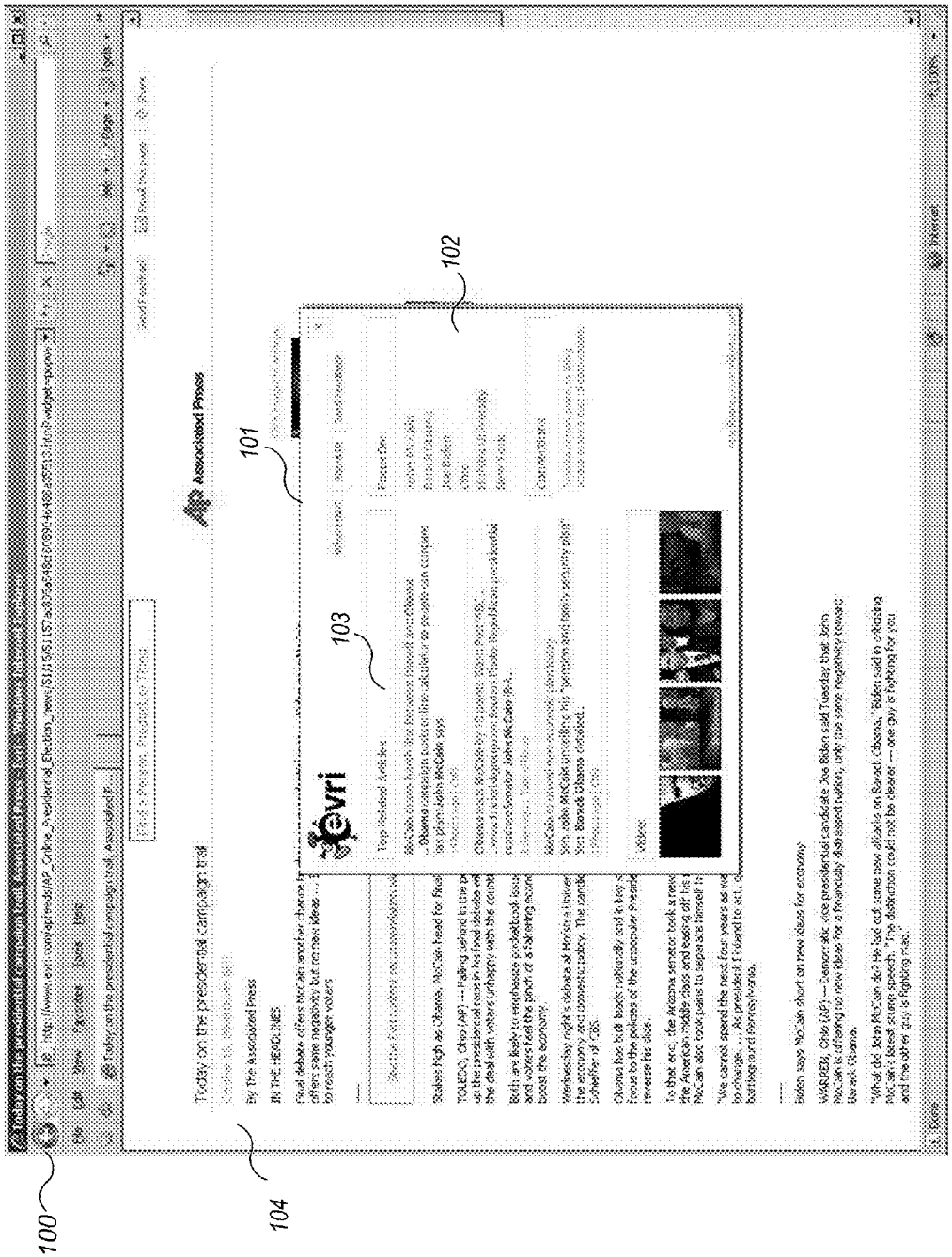
FIG. 1B is an example screen display of an example NLP-Based Content Recommender presented to recommend content relating to underlying text.

FIG. 1B is an example screen display of an example NCR presented to recommend content relating to underlying text. The news article web page 104 is shown presented using web browser 100 as described with reference to FIG. 1A. An example NLP based content recommender 101 is displayed as a pop-up window 101 accessible from an icon 150 in FIG. 1A. The example embodiment of NCR 101 shows an section 103 of "Top Related Articles" and a filter section 102 of focus terms that may be used to filter the top related articles shown in section 103.

In at least some embodiments, the NCR may use context information relating to source information that was used to establish and identify the entities (e.g., verbs, related entities, entities within close proximity in the underlying text or in other text, or other clues) in the recommendations. In some embodiments, algorithms are employed for natural language-based entity recognition and disambiguation to determine which entities are present in the underlying text. For example, these algorithms may be incorporated to display an ordered list of all, or the most important, or the top "n" entities present on a Web page in conjunction with the underlying page. The items on the list can then be used to navigate to additional (related) content, for example, as "links" or other references to the content. The example NCR illustrated in FIG. 1B performs extensive NLP-based searching and processing in the background to identify the entities in the underlying article 104 and then to find and order the top related articles that are displayed in section 103.

An example system that supports the generation of an ordered list of entities is described in co-pending U.S. patent application filed concurrently herewith, assigned application Ser. No. 12/288,158, and titled "NLP-Based Entity Recognition and Disambiguation," which is incorporated by reference it its entirety.

In addition, in at least some embodiments, an NLP-Based search mechanism can be incorporated by an NCR to find related (e.g., auxiliary or supplemental) information to recommend. Contextual and other information, such as information from ontology knowledge base lookups or from other knowledge repositories may also be incorporated in establishing information to recommend. One such system and methods for generating related content using relationship searching is encompassed in the InFact® relationship search technology (now the Evri relationship search technology), described in more detail in U.S. patent application Ser. No. 11/012,089, filed Dec. 13, 2004, which published on Dec. 1, 2005 as U.S. Patent Publication No. 2005/0267871A1, and which is hereby incorporated by reference in its entirety. In this system, NLP-based processing is used to locate entities and the connections (relationships) between them based upon actions that link a source entity to a target entity, or visa versa (i.e., queries that specify a subject and/or an object, and zero or more verbs that may relate them).

In addition, the InFact®/Evri technology provides a query language called "IQL" (now "EQL") and a navigation tip system with query templates for generating relationship queries with or without a graphical user interface. Query templates and the navigation tip system may be incorporated by other code to automatically generate generalized searches of content that utilize sophisticated linguistics and/or knowledge-based analysis. The InFact®/Evri tip system not only performs the NLP-based search, but can order the results as desired. In addition, the tip system can dynamically evolve the searches—hence the related entities—as the underlying text is changed, for example by filtering it using focus terms 102 in FIG. 1B. Additional information on the InFact®/Evri navigation tip system is found in U.S. patent application Ser. No. 11/601,602, filed Nov. 16, 2006, which published on Jul. 5, 2007 as U.S. Patent Publication No. 2007/0156669A1, and in U.S. patent application Ser. No. 12/049,184, filed Mar. 14, 2008, which are herein incorporated by reference in their entireties. Other and or different NLP-based processing may similarly be incorporated by example embodiments of an NCR.

In at least some embodiments, NCRs are provided by means of a user interface control displayed adjacent to, approximate to, on or near other displayed content such as illustrated in FIG. 1B. Such an interface control can be implemented in the form of a "widget" (e.g., a code module, excerpt, script, etc.), which can be made available to third parties and other content providers to associate with content they control. In addition, a user or other widget consumer (such as a content creator or distributor) can download a widget provided via a URI or URL (uniform resource identifier or locator), web portal, server, etc. For example, a content creator may download an NCR widget for installing it as a plug-in in the creator's blogging platform. The NCR widget may have one or more associated representations, i.e., icons, images, or graphical symbols, which may take many different forms, and which can be displayed on a display screen and used to invoke the functionality of the widget. In some embodiments, customizations, such as different UI renderings, color schemes, capabilities, etc. may also be available when the widget is installed. Also, in some embodiments, NCR widget end users (those using the widgets to display related content) may also be provided with customizations.

FIG. 5 is an example code for installing an example embodiment of an NCR in a content creator's Web page. In particular, the script 501 may be integrated to provide a pop-up window NCR widget, such as that illustrated in FIG. 1B. In this example, the script 501 and installation notes 502 are provided on a Web page controlled by the widget created. Although the particular script 501 is written in html (which includes JavaScript), appropriate other scripting languages (e.g., Ruby, Perl, and Python) can be used in other environments to include an NCR widget. For example, a VisualBasic script may be used to provide a similar NCR widget in a Microsoft Office environment.

Such widgets need not be limited to displaying related content accessible via a Web browser. Indeed, NCR widgets also may be useful in a variety of other contexts and platforms, such as to create other mechanisms for finding sought after data in large repositories of information (e.g., corporate intelligence data bases, product information, etc.), to perform research or other discovery, to provide learning tools in educational environments, to navigate newsletters and archived articles for a company, etc. NCRs are intended to aid in conveying meaningful information to end users from among a morass of data without them necessarily knowing how to search for that information. They are intended to do a better job at emulating "understanding" the underlying text than a keyword search engine would, so that users can search less and understand more, or discover more with less work.

NCR widgets present user interfaces that may vary depending upon the context in which they are integrated, their use, etc. FIGS. 1B-13 illustrate several different example embodiments of forms for such widgets that contain content summary information, and controls for navigating to related or other contextually-significant information. In at least some embodiments, an indicator (such as a hypertext link, or hyperlink) is displayed proximate to a respective entity if more or recommended related information is available. Also, in some embodiments user interface controls are provided to navigate to and among the various supplemental information. For example, one or more indicators for navigating to the supplemental information may be presented. These indicators may be presented in the form of links, graphical symbols, icons, shapes, logos, trademarks, or the like. Many variations for presenting widgets/user interface controls are possible, and the ones presented in FIGS. 1B-13 are merely illustrative and not intended to be exhaustive.

In at least some of the NCRs, the name of entity (e.g., Barack Obama) is provided along with an indication of the type of entity and/or its roles (e.g., categories or facets, such as senator, democrat, presidential candidate). Then, for some NCRs, a list of facts about the entity and/or an overview of further content is displayed. In at least some embodiments, an image associated with the named entity is also displayed. Importantly, if more information (as determined by the NCR) is available, then a link (also referred to as a hyperlink, hypertext, or other indicator) may be displayed. The link may be operated (e.g., selected or navigated to) by a user to navigate to recommended content. Other features, including more or different features may be provided or combined in an embodiment of an NCR as helpful in the context.

For example, as described earlier, the example NCR 101 in FIG. 1B is provided in a pop-window on top of underlying news article content 104. The "Focus On" list in filter section 102 is created using the natural language processing methods described above. In particular, section 102 lists the "most important" named entities found in the underlying content as determined by NLP-based relationship searching (such as that provided by the InFact®/Evri relationship search technology). Different definitions of "most important" may be used in the NCR, including but not limited to frequency of use in the article, popularity among a set of documents searched, etc.

Figure 1C:
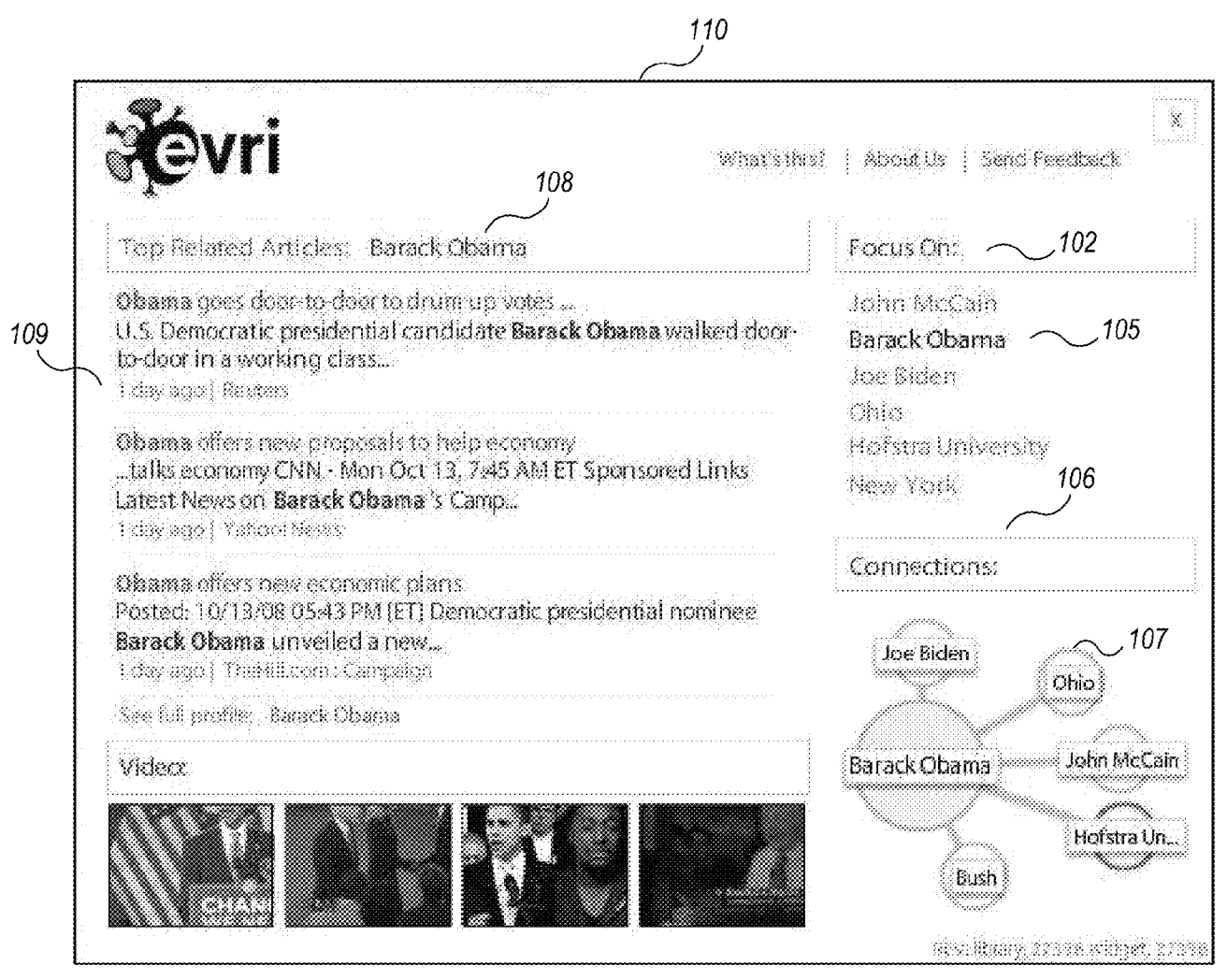

FIG. 1C is an example screen display illustrating the result of selection of one of the named entities in the underlying content. In particular, when the user selects, from the filter section 102, the link "Barack Obama" 105, which is a named entity found in the underlying content, the top related articles section 108 changes to reflect new recommendations. In at least some embodiments, the NCR executes a natural language based relationship query, such as an EQL query, in the background against some body of documents. The resulting information can be used to populate various fields in the user interface of the NCR and to find and suggest the recommended content that is displayed to the end user when, for example, the user navigates to such content via a displayed link. Accordingly, the related articles section 109 shows the result of executing a query of Barack Obama relating (in one or more ways described by actions/verbs) to one or more of the named entities in the underlying content (the news article 104).

The illustrated NCR 110 also includes a "Connections" section 106, which provides a graphical map of the entities related to the selected named entity 105. The entities included in the graphical map 106 may be selected by the NCR 110 as the most popular entities, the most frequently described in the top related articles, or using other rules. In one embodiment, as shown, the entities in the connections map 106 are color-coded based upon their base type: for example, whether they are persons, places, or things (which may include organizations, products, etc.). An end user may select one of the nodes 107 on the map 106, to further change the recommendations by refining what is considered "related."

Figure 1D:
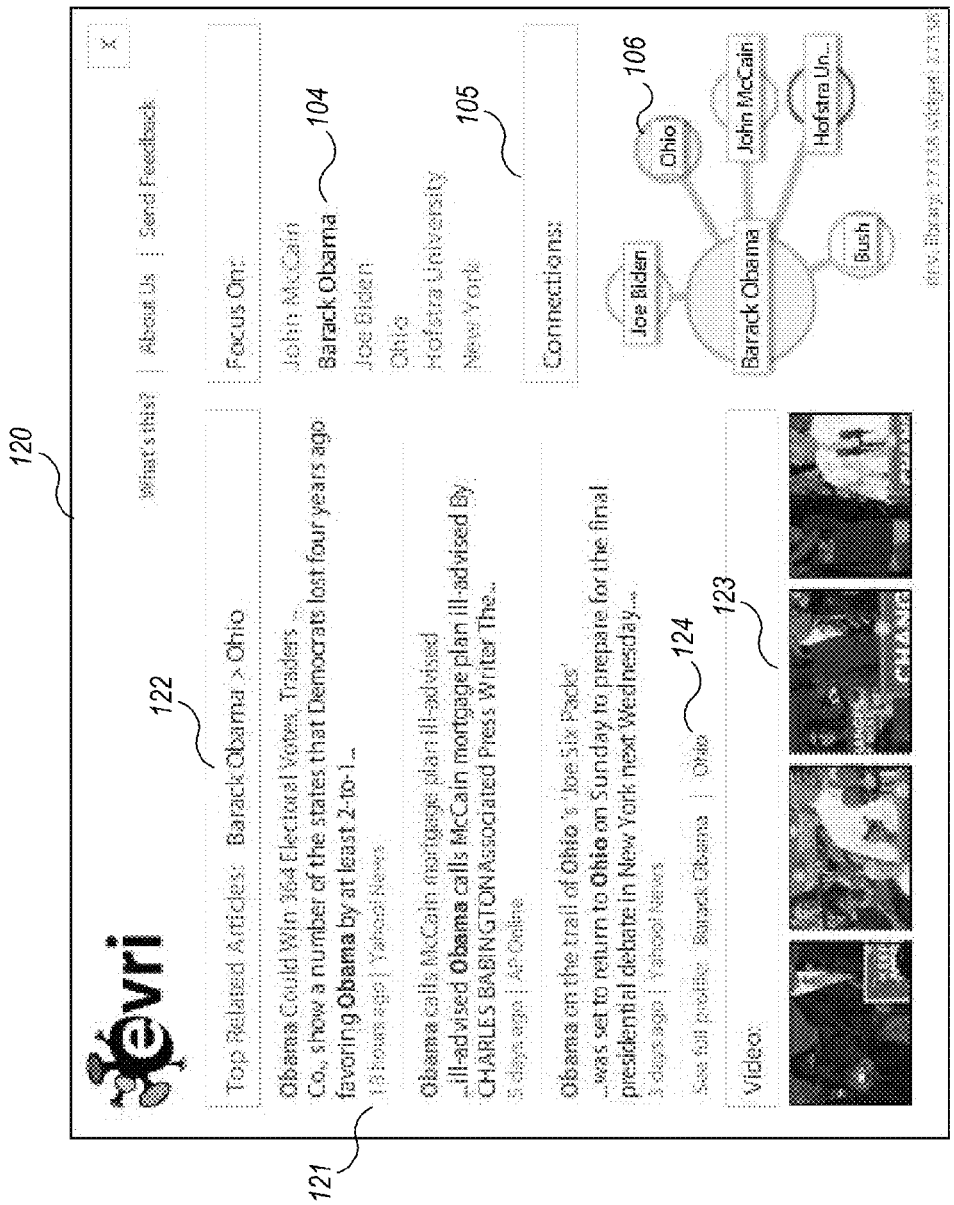
FIG. 1D is an example screen display of example refinements of recommendations of an example NLP-Based Content Recommender based upon selection of node in a connections map.

FIG. 1D is an example screen display of example refinements of recommendations of an example NCR based upon selection of node in a connections map. In FIG. 1D, the user has selected the node "Ohio" 106 in the illustrated NCR 120, which has caused the NCR to change its background searches to focus the recommendations on articles in which "Barack Obama" is connected (related by action/verb) to then entity "Ohio." This changed focus is reflected in field 122. The articles now displayed in the recommended articles section 121 reflect the top articles that describe something about Baracks interactions with Ohio. Full profiles (descriptions of useful, related information) are obtainable by selection of the links for the named entities in the related articles section 121; that is for the entities 124.

Figure 1E:
FIG. 1E is an example screen display of an NLP-Based Content Recommender playing a selected video.

Example NCRs also may include still and or video images. By selecting link 123, the user can navigate to recommended videos that relate to the relationship between "Barack Obama" and "Ohio." Note that these recommendations may also be ordered and/or ranked. FIG. 1E is an example screen display of an NCR playing a selected video. A video 132 of Barack Obama is played in response to user selection of the video link 122. Images, when available, may be displayed similarly.

Note that FIGS. 1B-1E provide an example of one type of NCR. Many other example, including ones with very different appearing user interfaces, may be implemented.

Figure 2:
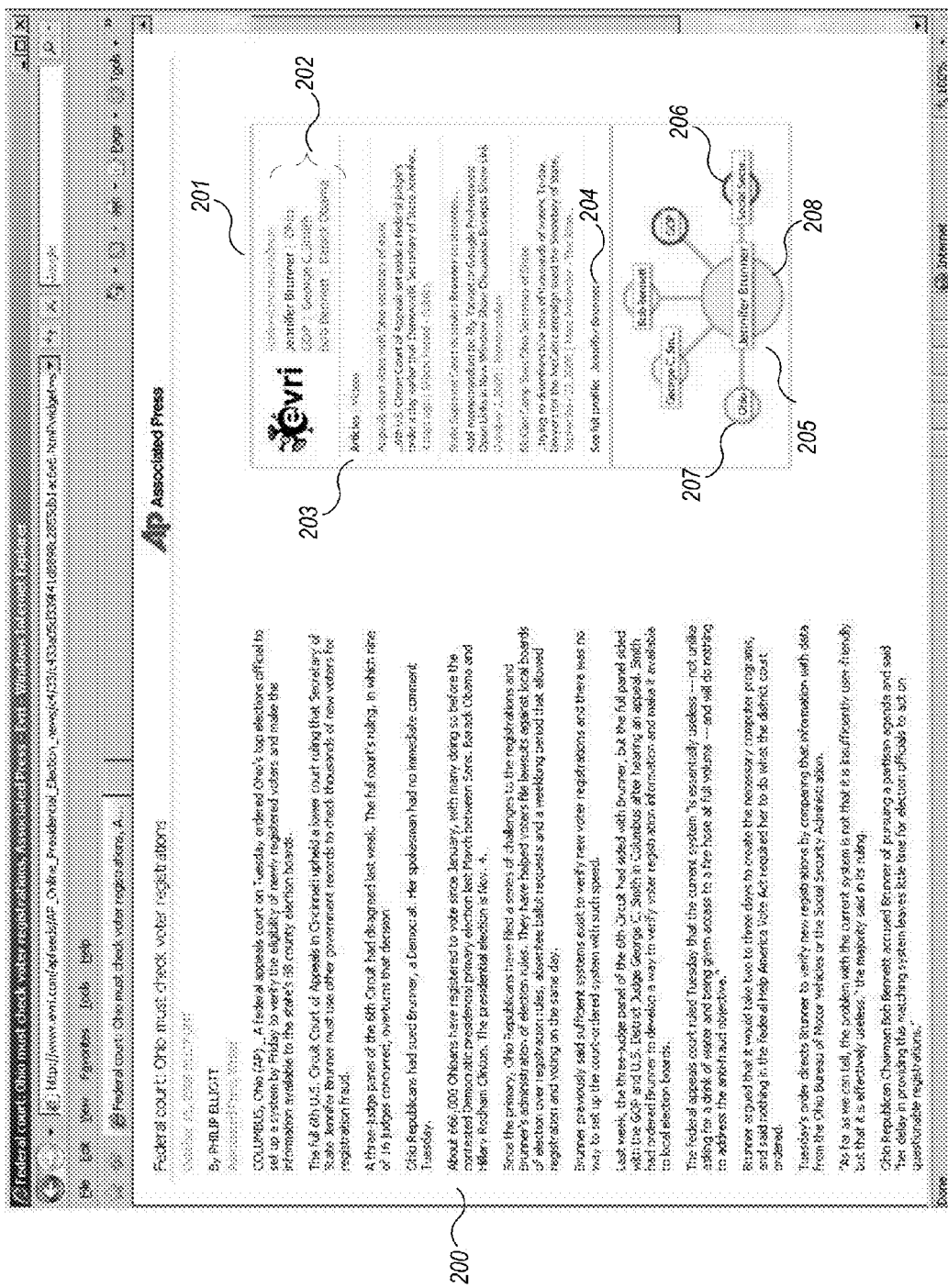
FIG. 2 is an example screen display of another type of NLP-Based Content Recommender widget presented adjacent to content.

FIG. 2 is an example screen display of another type of NCR widget presented adjacent to content. The NCR 201 is provided next to news article 200 and comprises and entity information section 202, a related articles section 203, and a connections map 205. The related articles section 203 and connections map 205 operate similarly to those described with reference to FIGS. 1B-1E. As is observable, in this particular NCR 201, persons (e.g., Jennifer Brunner node 208) are color coded in green, places (e.g., Ohio 207) in blue, and things—organizations (e.g., social security administration 205) in red. The entity information section 202 includes named entities from the article 200, ordered. In the embodiment shown, they are ordered in importance. Other orderings can be similarly incorporated. The NCR 201 also displays a link 204 to the profile (description of the named entity) of the most relevant named entity "Jennifer Brunner."

Figure 3A:
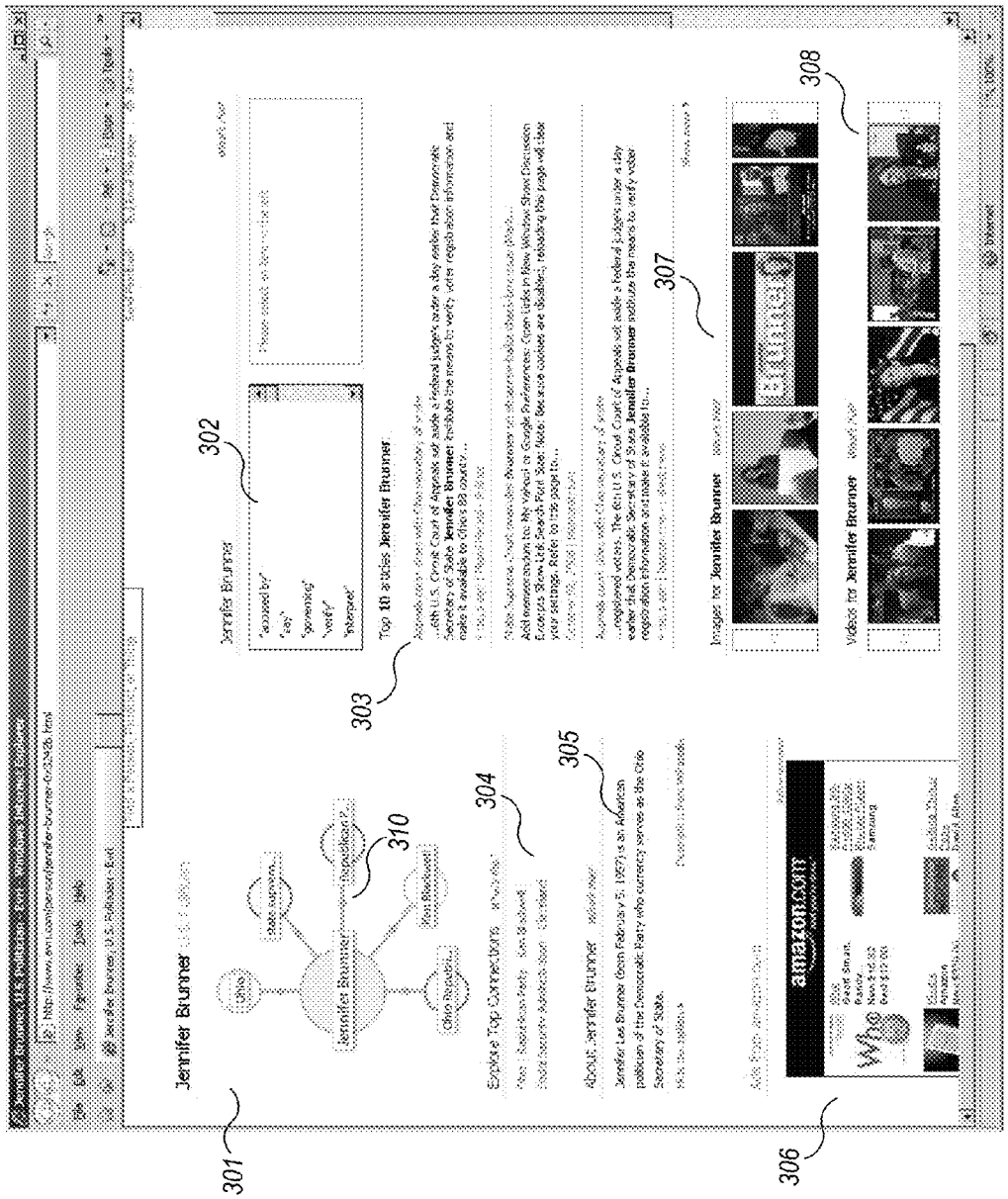
FIGS. 3A-3E are example screen displays of a named entity profile presented by an example embodiment of an NLP-Based Content Recommender.

FIGS. 3A-3E are example screen displays of a named entity profile presented by an example embodiment of an NCR. As can be observed, the user interface and controls are different than those provided in FIGS. 1B and 2; however, many of the same capabilities of an NCR are present. In particular, the example NCR of FIG. 3A provides a connection map 301 and a top articles section 303 that recommends the "top" articles relating to the named entity "Jennifer Brunner." Again, these articles may be ordered based upon the most current and/or frequency of mentioning Ms. Brunner, popularity of access to articles, most relationships entities connected to Ms. Brunner, or based upon other definitions of topmost. The NCR also provides a user interface control 302 for modifying (by filtering based upon action) the articles 303 displayed. In addition, the NCR includes a recommended images area 307 with links to one or more images; a recommended videos area 308 with links to one ore more videos; a section reserved for advertisements 306 (which may also be targeted to the profile being displayed); top connections links 304 to explore profiles of the entities most current and relevant to the displayed profile and to filter the top articles section 303; and an about section 305, which contains a brief description and fast facts regarding the named entity whose profile is being displayed.

Figure 3B:
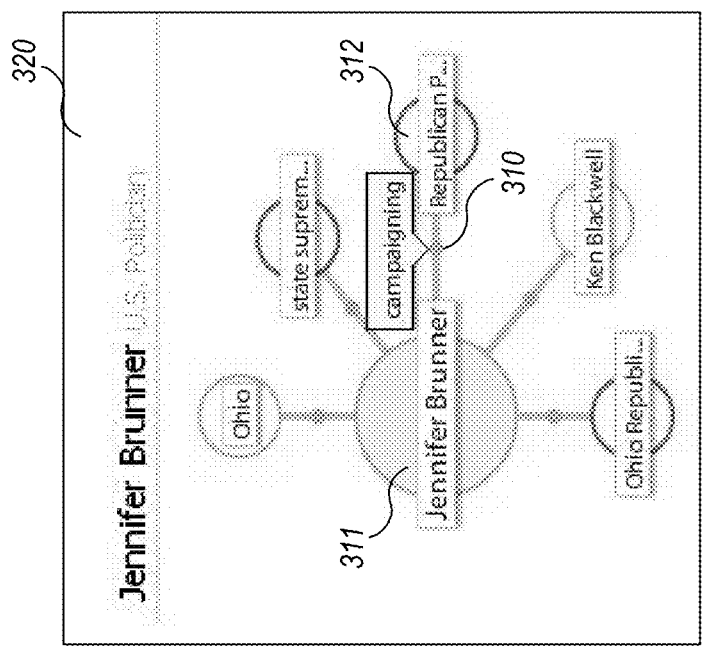

FIG. 3B illustrated details of the connections map shown in FIG. 3A. In particular, in connections map 320, the large central circle (or node) (e.g., node 311) represents the profiled person, place, or thing. The smaller nodes (e.g., node 312) are its top connections. The lines between the nodes (e.g., line/dot 310) represent the actual connection, which may be presented, for example, when the user hovers an input device over the dot on the line. When a user selects the action (e.g., dot 310), the top articles section is updated to reflect that connection.

Figure 3C:
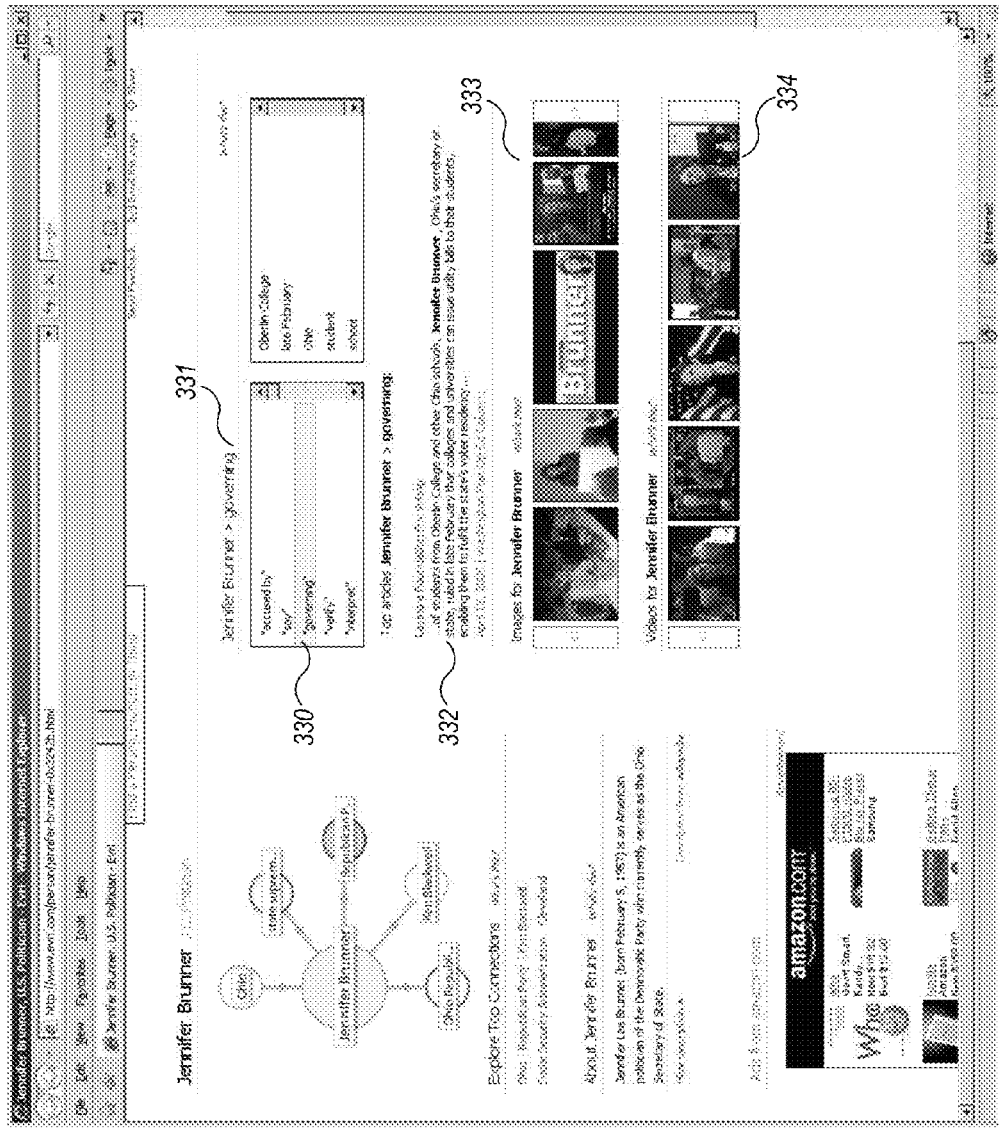
Figure 3D:
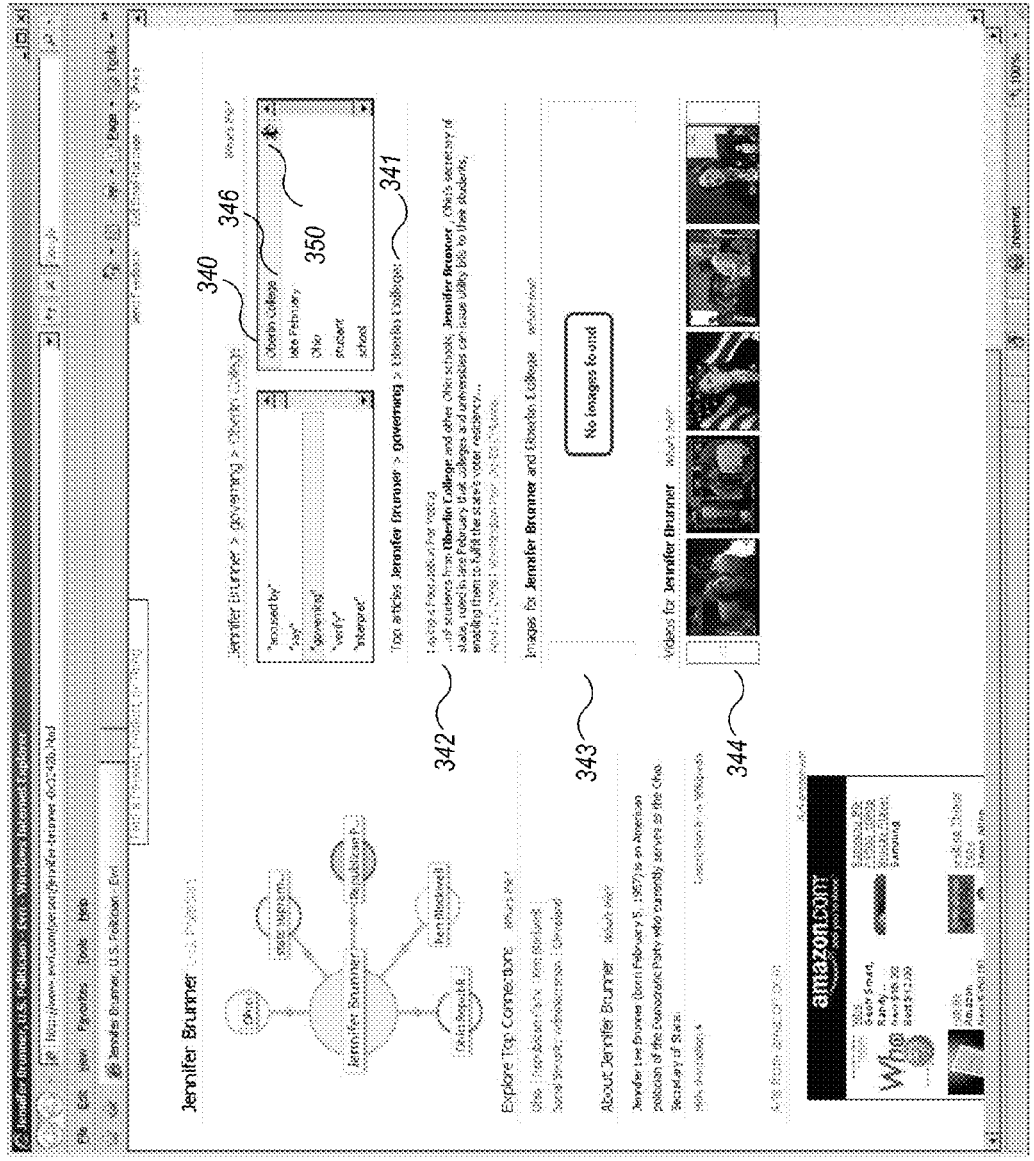

FIG. 3C illustrates the modifications to the articles 332 displayed when the user interface control 330 is selected to cause filtering based upon a selected action. Here, the user has selected the action (i.e., verb) "governing" as reflected in field 331. As a result, the NCR displays the top articles 332 that show the current entity "Jennifer Brunner" in a governing relation with other entities. The top recommended images section 333 and videos section 334 have been updated as well. In some embodiments the user interface control 330 also includes modifiers of the various named entities, so that the user may follow leads and find more information on, for example, the roles of the various entities.

Figure 3E:
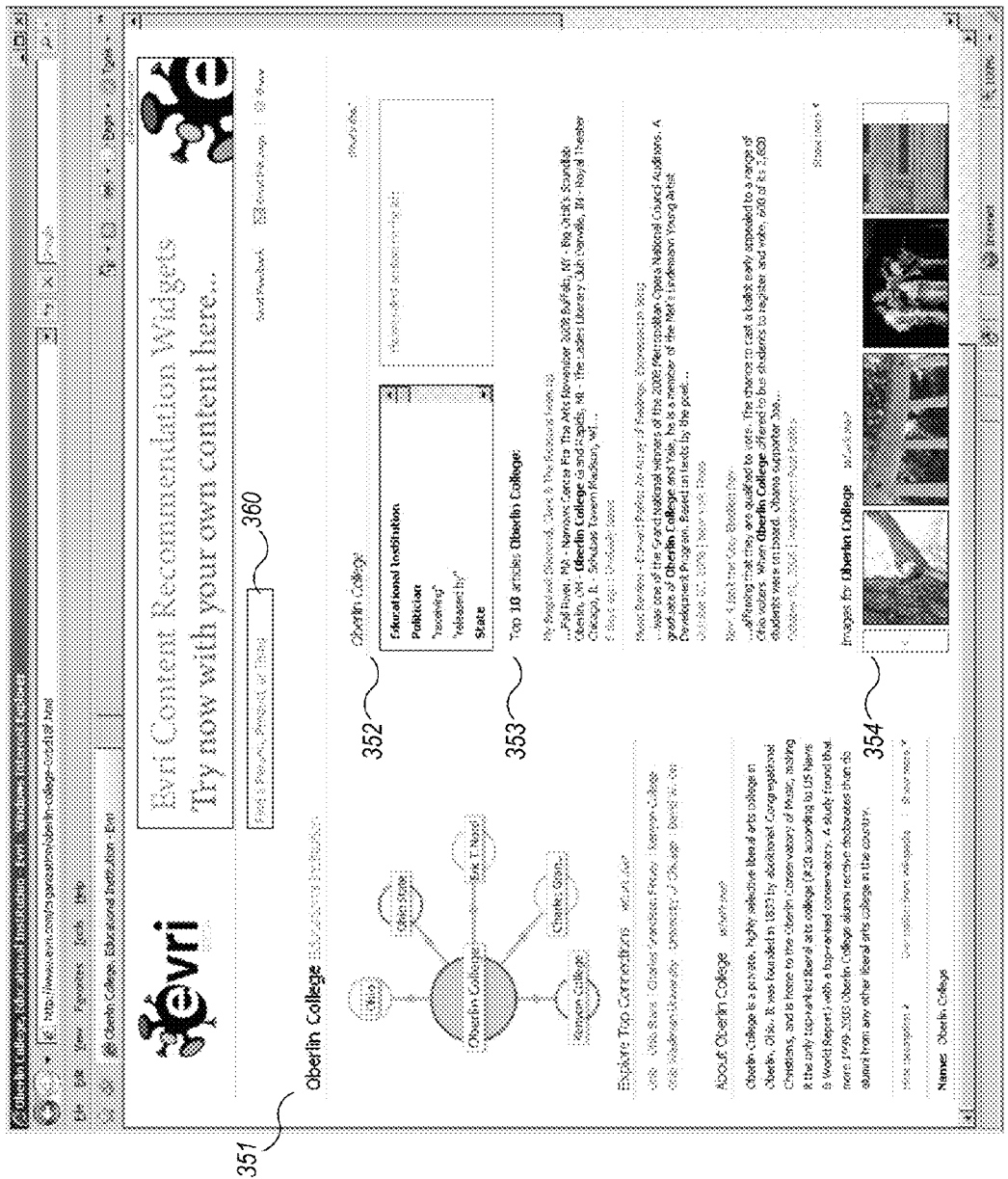

The powerful NLP based search processing identifies the topmost entities in the relationship displayed by the articles recommended in section 322. That is, these are the entities involved in a "governing" relationship with "Jennifer Brunner." FIG. 3D lists these related entities in section 340, which can be selected to further filter the top articles display. For example, when the user selects the "Oberlin College" link 346, the filtering (an abbreviated EQL) is shown in area 341, the articles are changed to reflect the selection in top articles 342, and the recommended images links 343 and videos links 344 are also updated. By selecting the icon 350, the user is able to navigate to the profile page for that entity when one is available. FIG. 3E is an example of the profile page 351 for Oberlin College displayed when the icon 350 is selected for the Oberlin College link 346. The user interface control 352 shows the actions for "Oberlin College" that can be selected for further filtering. The top articles 353 and images 354 are dated for the entity "Oberlin College."

Figure 4A:
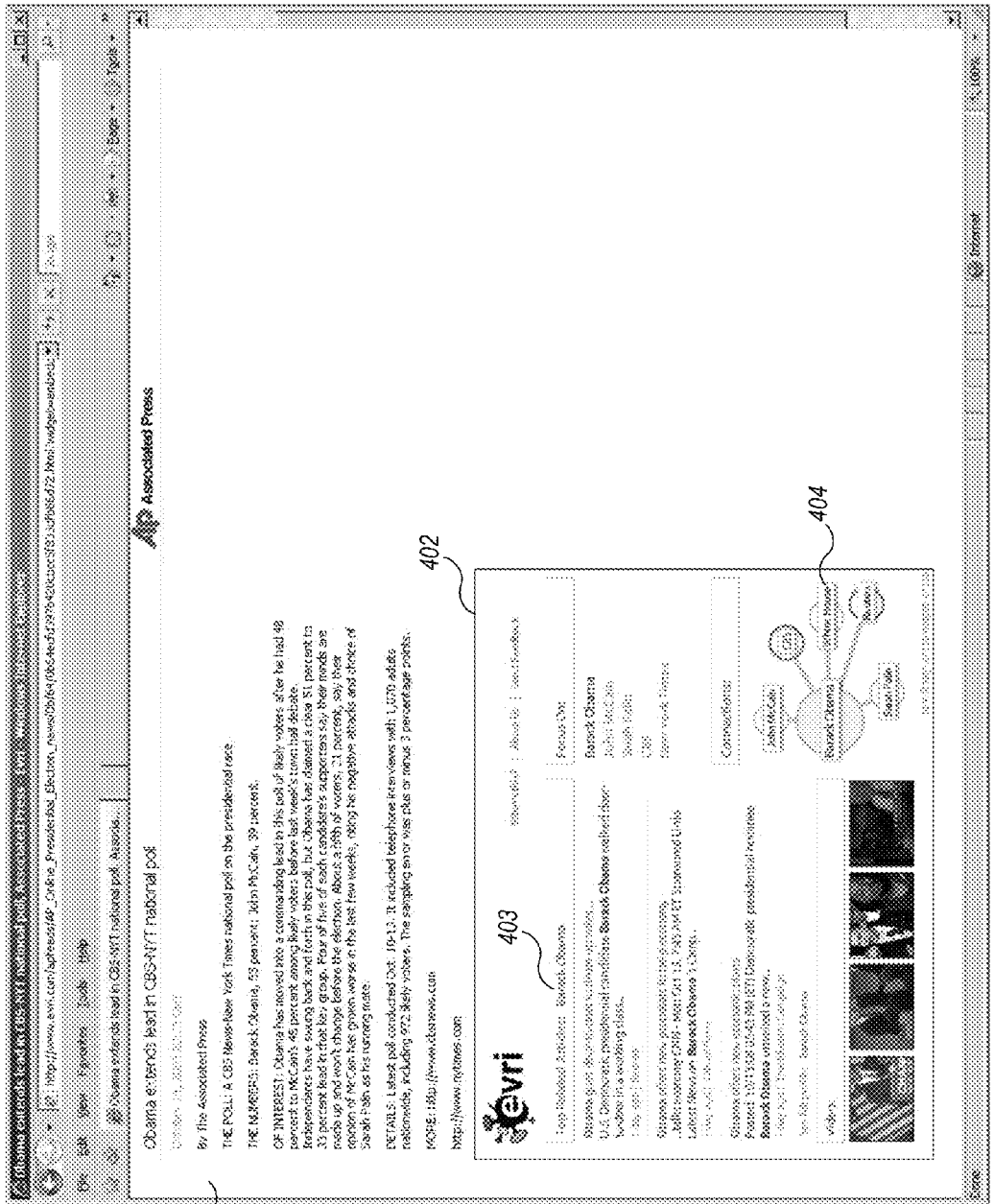
Figure 4B:
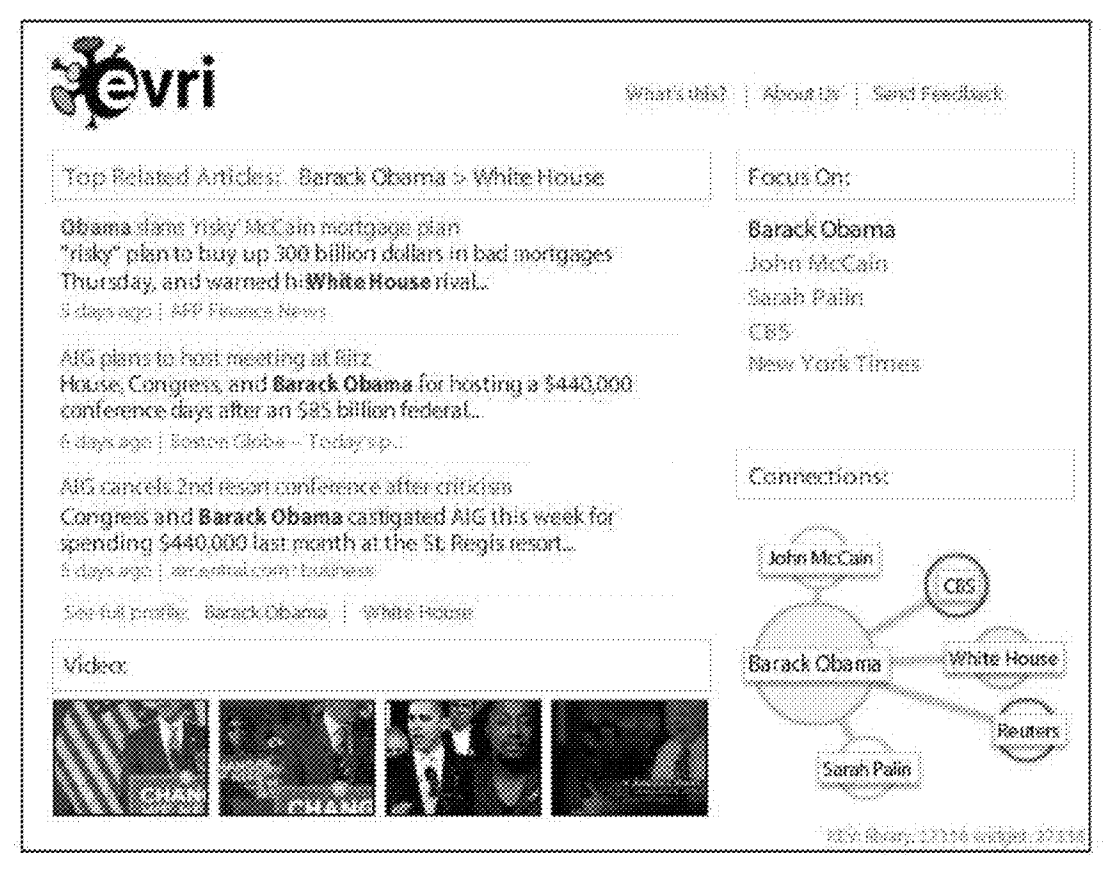
Figure 4C:
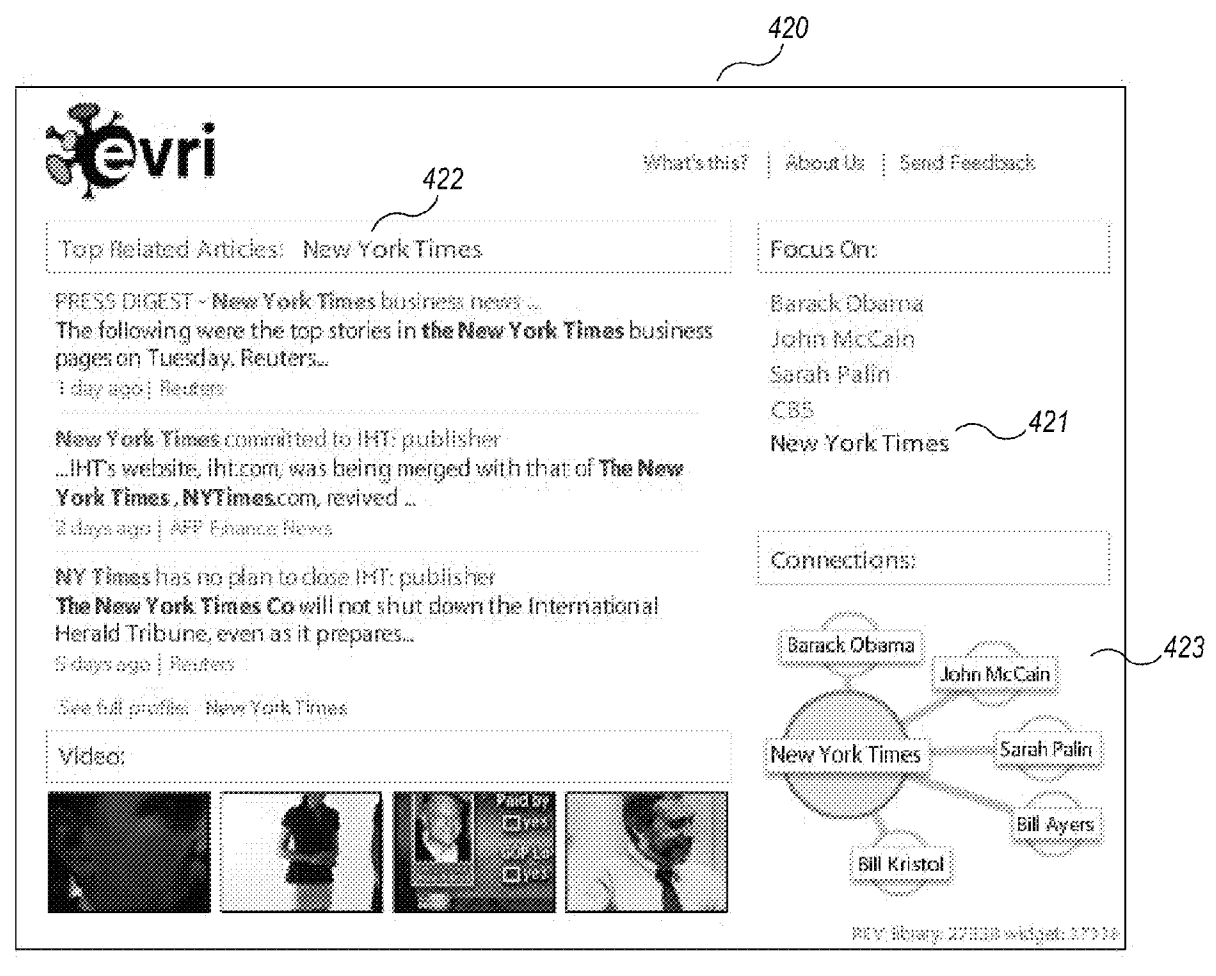

FIGS. 4A-4C are example screen displays of another type of NCR widget presented adjacent to content. In this case, the NCR 402 is displayed below the news article 401. The behavior of this NCR widget is similar to that described with reference to FIGS. 1A-1E. FIG. 4A illustrates what the NCR looks like when it is invoked. FIG. 4B illustrates the results when a user selects the connection node "White House" 404 (in relation to Barack Obama 403). FIG. 4C illustrates example results when the user selects a related named entity in NCR widget 420. In particular, when the user selects one of the named entities in the recommended articles, here "New York Times" link 421, the connection map 423 and the related top articles 422 are changed to reflect that entity as the focus. Other behaviors are of course possible.

FIGS. 6-13 are provide a variety of additional forms for the user interfaces of example embodiments of an NCR.

FIGS. 6A-6D illustrate example screen displays for an example embodiment of an NLP-Based Content Recommender in the form of (hypertext) links to further information. The link can be used to navigate to the information, which is based upon the entities recognized in the underlying content. For example, in FIGS. 6A and 6D, several recommendation user interface controls and "tips" are illustrated (and presumed to be based upon the underlying content shown, or resultant from a relationship search). In particular, tip 609 displays information relating to Al Qaeda and tip 601 displays information relating to Barack Obama. For each of these NCR tips, other forms/presentations are displayed beneath them.

As described above, the layout of an NCR tip or user interface control (UI control) may depend upon the information available. Generally, in the example illustrated in FIGS. 6A-6D, the name of the entity 602 (e.g., Barack Obama) is presented, followed by the entity types and roles relating to the entity 603 (e.g., senator, democrat, presidential candidate). Then, for some tips and/or UI controls, a list of facts about the entity 604 or 608, with or without tags, and/or an overview 607 of further content is displayed. In at least some embodiments, an image 606 associated with the named entity is also displayed. Importantly, if more information (as determined by the NCR) is available, then a link 605 (also referred to as a hyperlink, hypertext, or other indicator) may be displayed. The link 605 may be further navigated by a user to display recommended content.

Figure 6A:
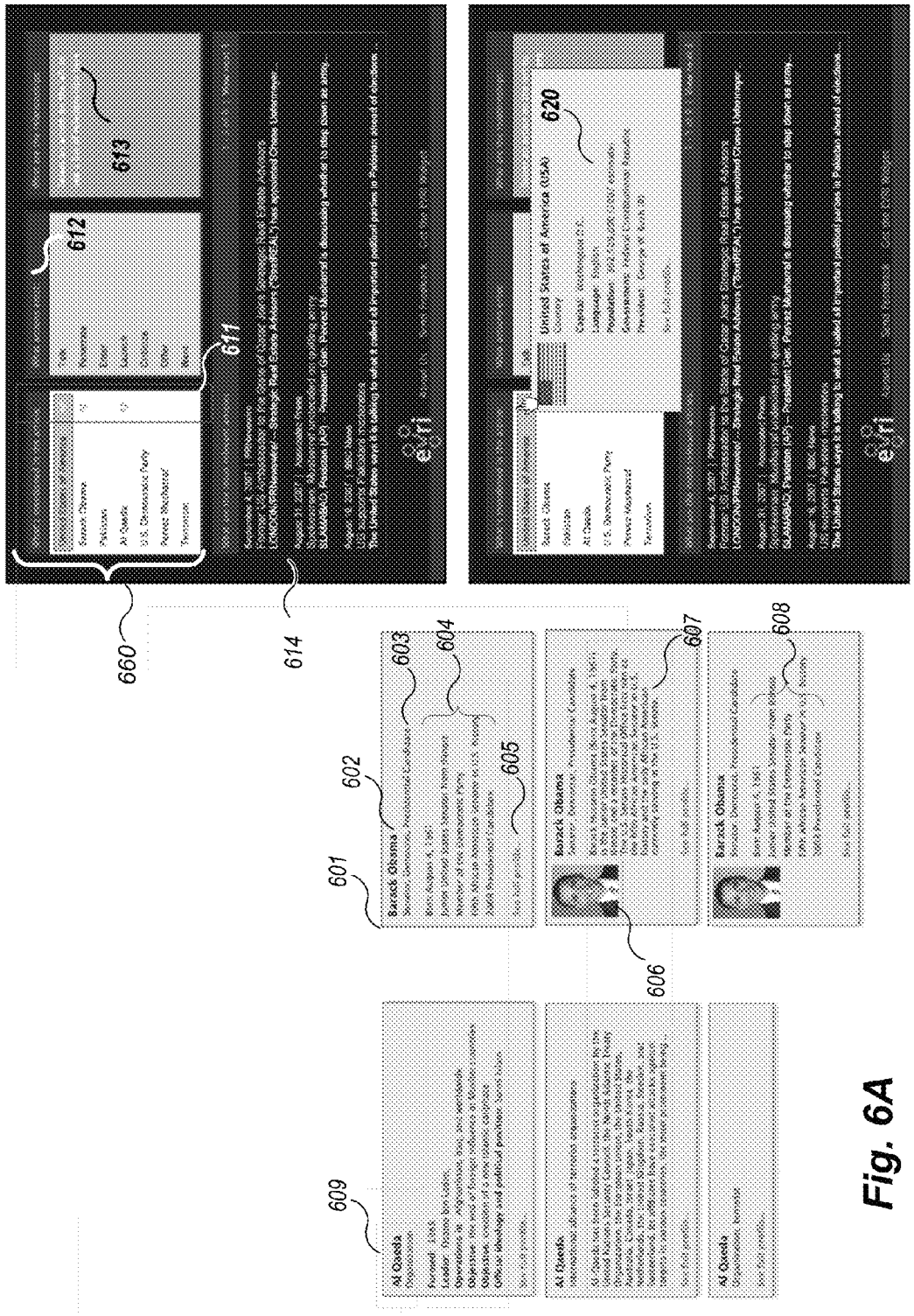
Figure 6B:
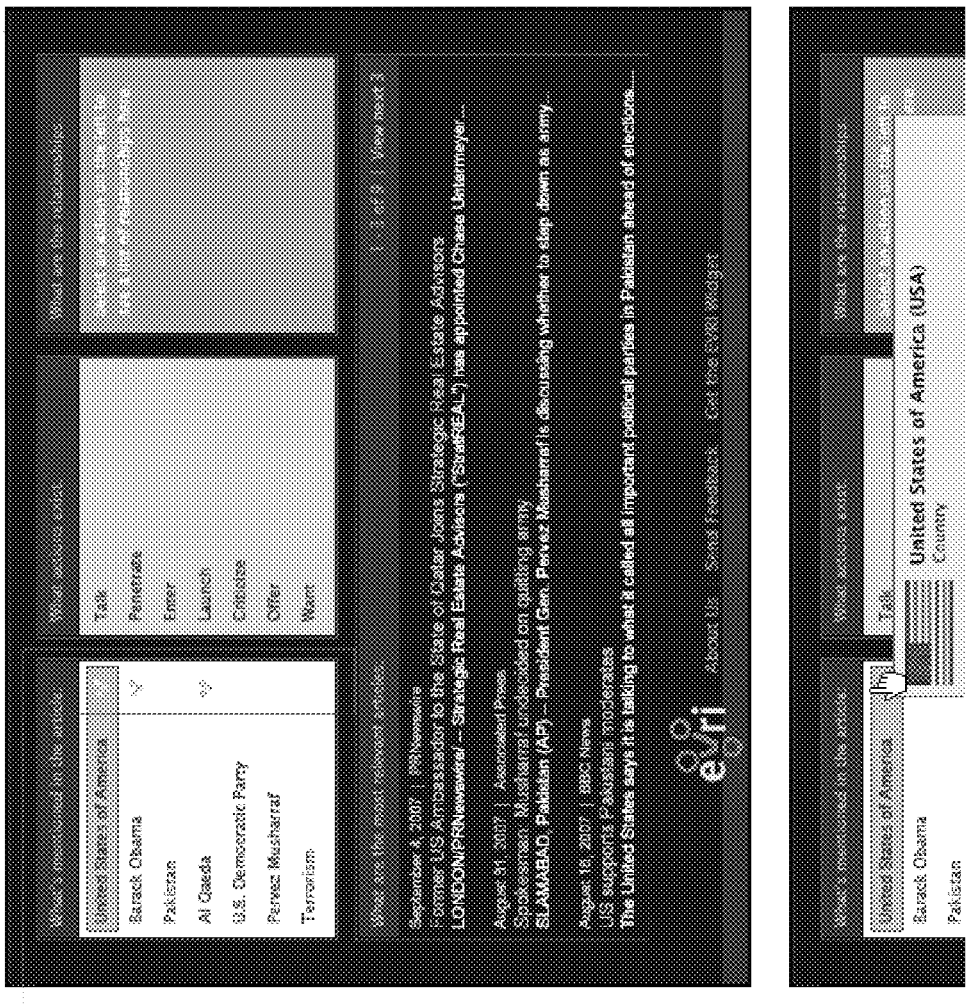
Figure 6D:

For example, as shown in larger images in FIGS. 6B and 6C, the link 605 may be used to navigate to an NCR widget provided, for example, on a designated website, or transparently. In FIGS. 6A and 6C, a list 660 is displayed of the recognized entities in an underlying text segment. This list 660 presents an indicator of the name of the entity, optionally followed by a symbol 611 of some sort, when further content is available. For example, when "Barack Obama" is selected, one of the tips 601 is displayed as previously described. Similarly, when the "United States of America" is selected, a UI control such as tip 620 is presented. In addition to the (ordered) list of named entities 660, the NCR widget presents a set of actions 612, and, when an action is selected, a list of the relationships 613. In NLP terminology, selecting the action (or verb) will generate a representation of the subjects or objects related to the selected entity via that verb. In at least some embodiments, a list of the most relevant articles 614 to the currently displayed article is also presented. This list can be implemented using the InFact®/Evri search technology described in detail elsewhere. For example, the summary sentence that is displayed for each article may indicate where the specific relationship was found.

According to one example embodiment, to populate the fields of the tip or UI control, such as action list 612 and connections list (relationships list) 613, an IQL/EQL query may be performed against the last "W" weeks of news content to return related information. In the illustrated case, "N" results are returned for actions performed by the entity, in this case United States of America, sorted by action (verb) frequency. The top "V" verbs are then displayed, as seen in action list 612. In other embodiments, actions could be derived from an NLP-based relationship extraction of the context (trigger) text or a set of documents related to the context text, or from other sources.

Figure 7A:
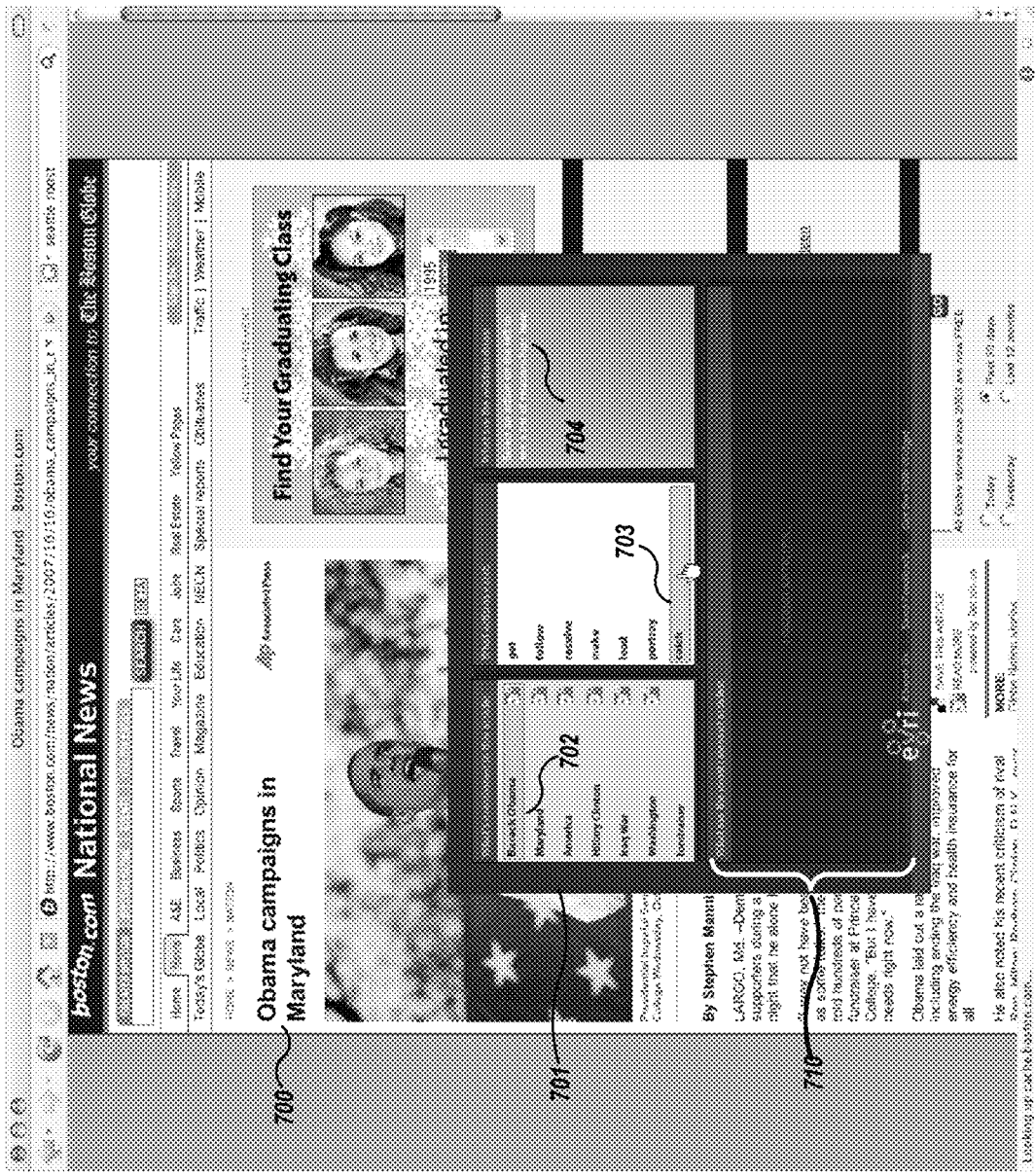
FIGS. 7A and 7B are example screen displays that illustrate use of the widgets shown in FIGS. 1A-1D integrated into an application.
Figure 7B:
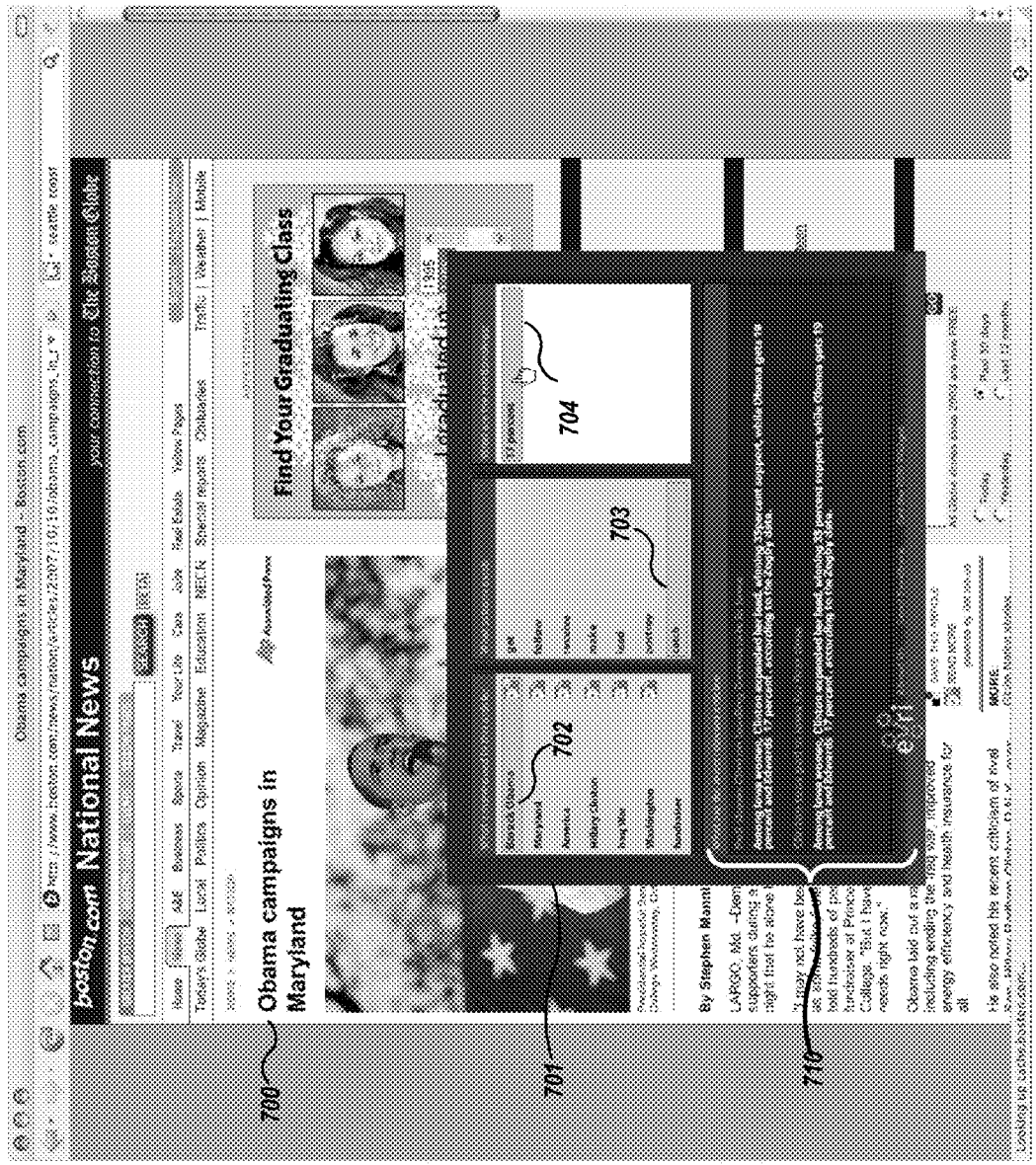

FIGS. 7A and 7B are example screen displays that illustrate use of the widgets shown in FIGS. 6A-6D integrated into an application, such as a news content provider site. In FIGS. 7A and 7B, underlying content 700, such as a news article about Barack Obama, is presented, for example, on a web page. Either automatically, or when explicitly or implicitly indicated by a user (depending upon the news platform implementation), an information widget such as widget 701 is displayed. This widget 701 has similar fields to those described with reference to FIGS. 1B-1D above.

The progression from FIG. 7A to 7B shows how the illustrated NCR widget can be dynamically updated as information is found or computed. For example, the widget can populate the relationships field 704 based upon the content shown in the most relevant articles field 710, which in turn is based upon the selected entity from entity list 702 and the selected action from action list 703. In at least some embodiments, the content of these fields is periodically updated, potentially automatically (and transparently) by rerunning the appropriate NLP queries on a periodic or defined schedule.

Figure 8A:
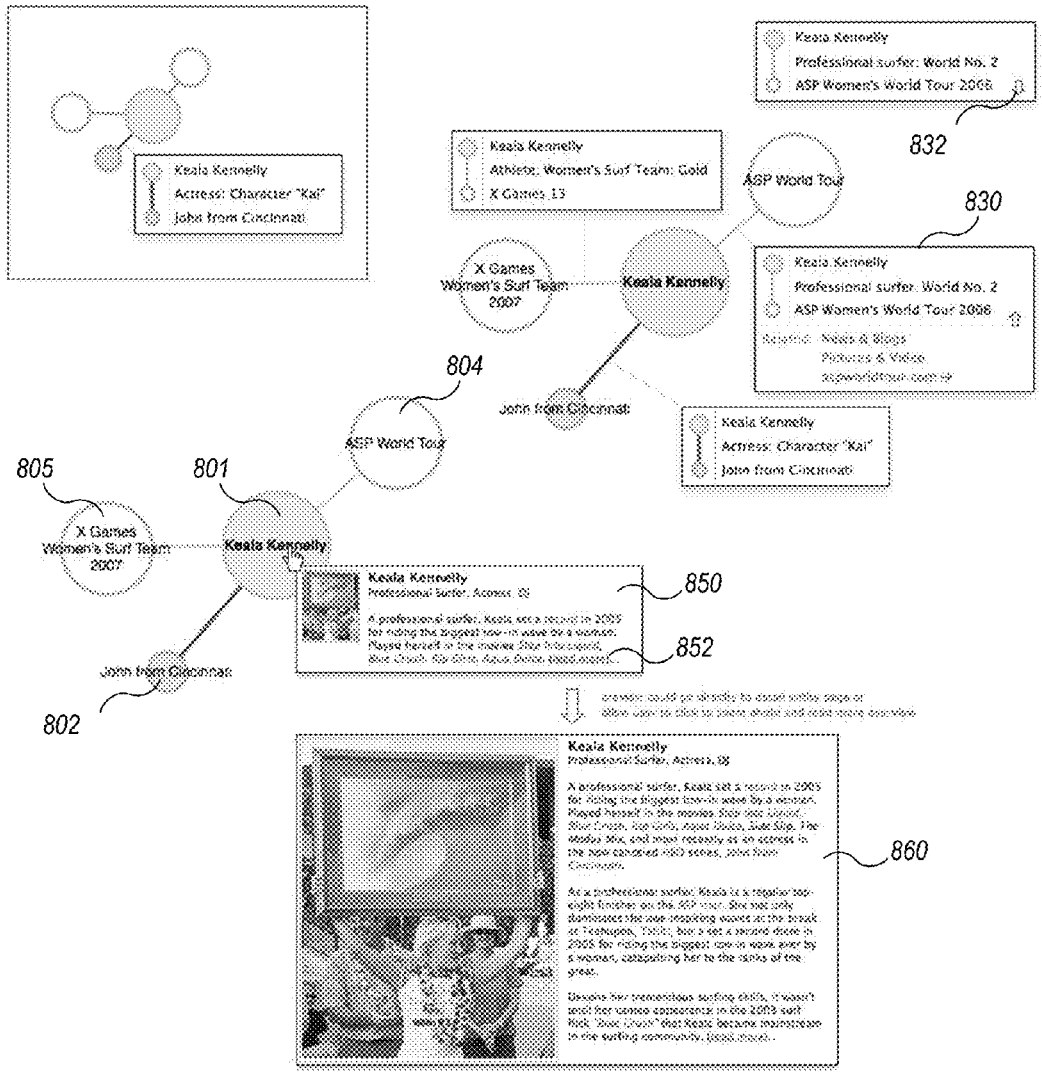
FIGS. 8A and 8B illustrate example screen displays for an example embodiment of an NLP-Based Content Recommender in the form of graphical links that can be used to navigate to further information.
Figure 8B:
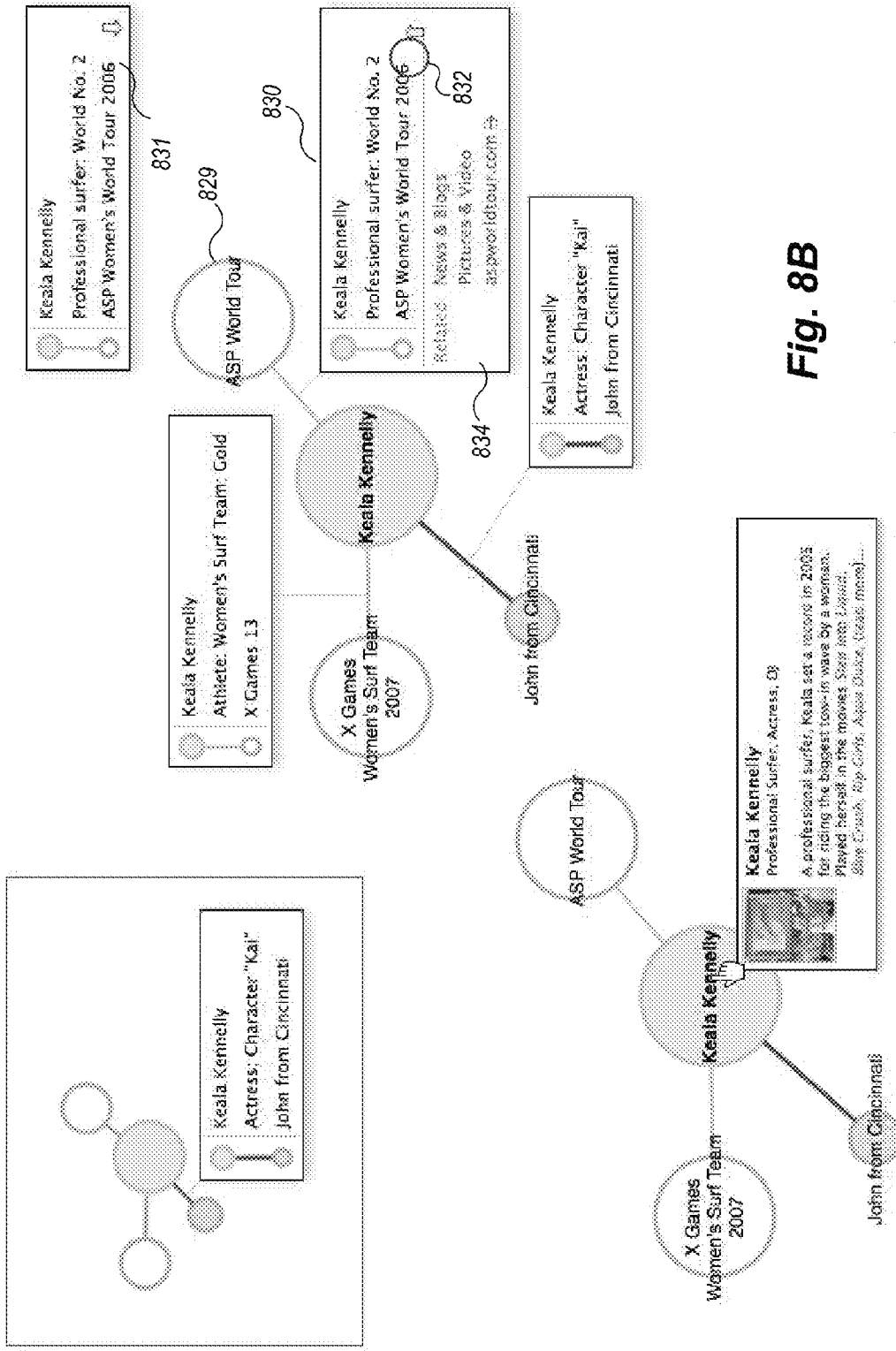

FIGS. 8A and 8B illustrate example screen displays for an example embodiment of an NLP-Based Content Recommender in the form of graphical links that can be used to navigate to further information. In this user interface paradigm, relationships are represented as connected nodes, and recommended content is used as "annotations" to the nodes and/or the connectors. For example, in FIG. 8A, several entities 801, 802, 804, and 805 are shown linked through their relationships. Entities 801 and 802 are person entities; whereas entities 804 and 805 are an organization entity and an event entity, respectively.

When the user hovers over or otherwise selects the named entity "Kaela Kennelly" 801, a tip 850 is displayed with initial information similar to that described with reference to FIGS. 6A-6D. Again, part of the displayed tip is a link (here labeled "(read, more)" 852) to further information. When a user navigates through the link, a detailed entity page 860 is displayed, which can be populated not just with static information, but with further content accessible via an NCR widget.

As shown in larger image in FIG. 8B, the relationship of entity Kaela Kennelly 801 to the ASP Women's World Tour 2006 event entity 829 is represented in summarized form in tip 831. When expanded by selecting a "more" graphical indicator 832, a more extended form of related content page 830 is displayed. The extended form 830 shows a list of categories of related content 834, for example news & blogs, pictures and video, and a related website. An embodiment of an NCR widget can be used to present and drive the content and/or the links displayed in the extended page 830. The user can return to the summary form by selecting a "less" graphical indicator 832.

FIGS. 9, 10A, 10B, 11A-11C, and 12A-12C illustrate additional alternatives for providing user interfaces and/or tips via an NCR widget used to provide related or recommended content.

FIG. 9 is another example screen display of a graphical representation of connections. A graphical representation is shown of the connections between a subject entity, here "Keala Kennelly, and all of the entities she interacts with. Entities having more distant connections, for example, as determined by the frequency of the relationships encountered, are displayed as nodes that appear further from the node that represents Keala.

Figure 10A:
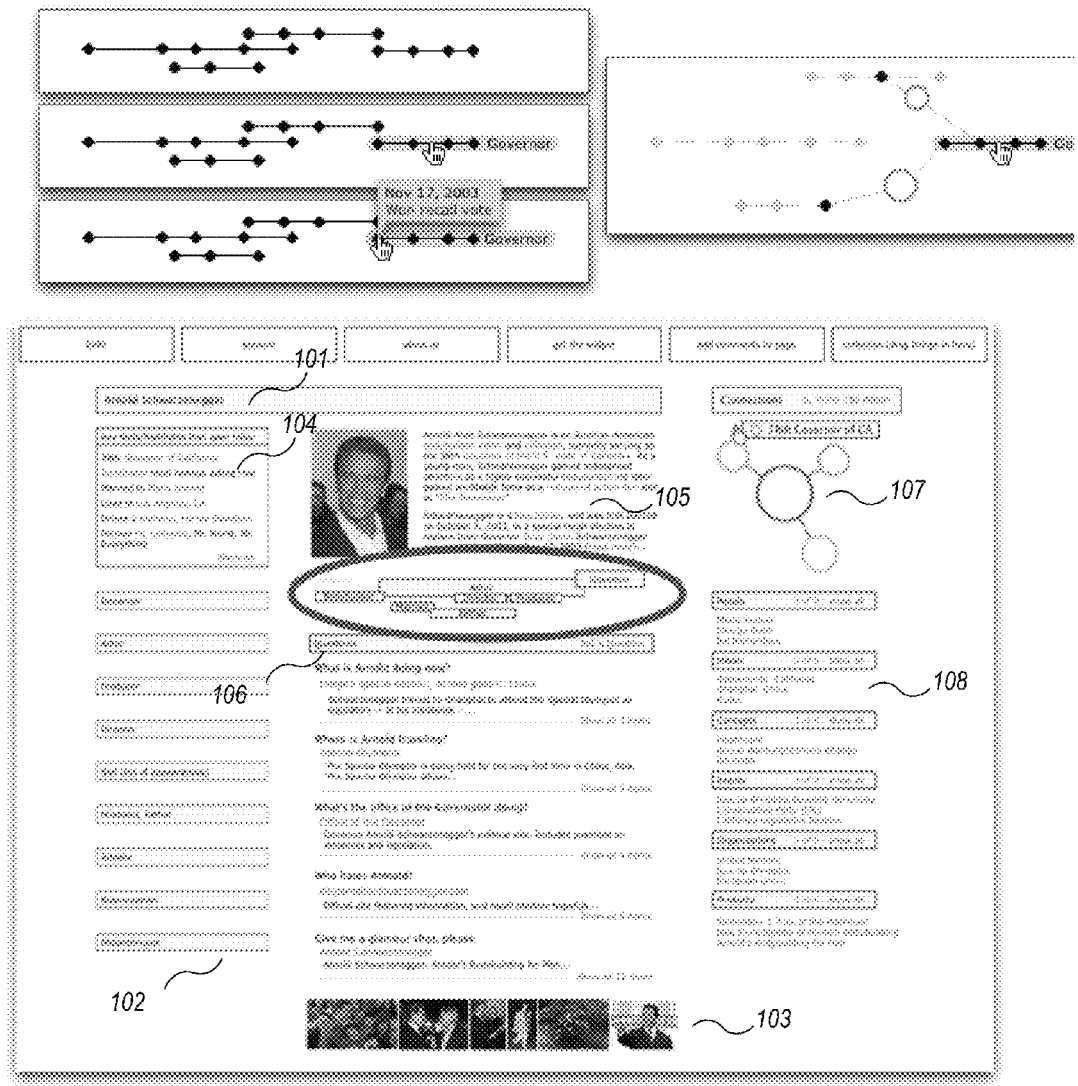
FIGS. 10A and 10B illustrate another interface for presenting related content to an underlying named entity.
Figure 10B:
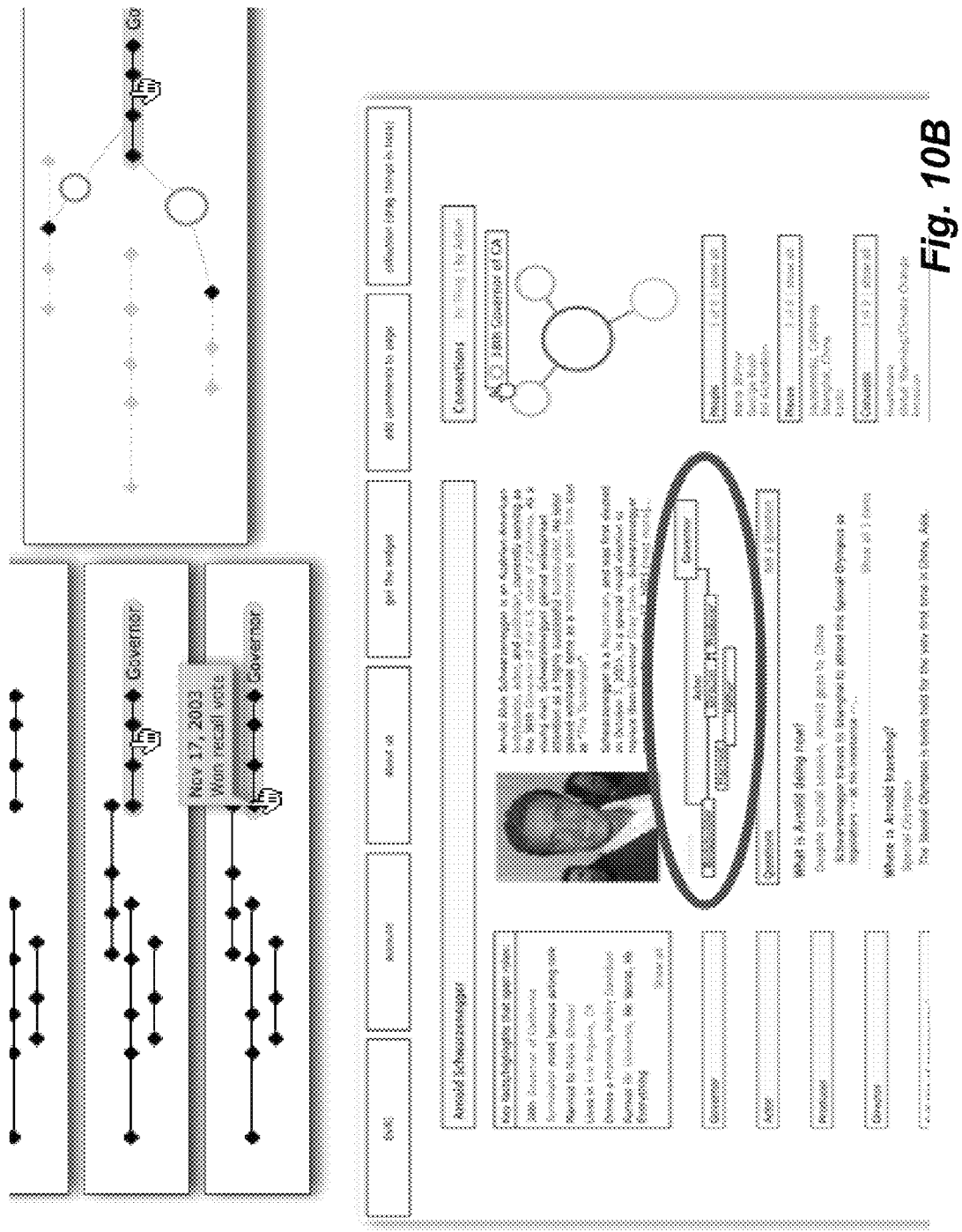

FIGS. 10A and 10B illustrate another interface for presenting related content to an underlying named entity, for example, one either selected by a user directly, or perhaps even indirectly via entity recognition of entities presented on an underlying web page. In the illustrated example, content relating to a named entity 1001 "Arnold Schwarzenegger" is presented. Fast facts area 1004 displays a number of tidbits of quick information regarding the named entity 1001, which may be available as determined by the frequency of information gleaned during the natural language based analysis of related information or other contextual information. Roles list 1002 contains a list of all of the roles (facets for or categories) found for the named entity 1001. A detailed entity description 1005 is shown followed by a graphical representation of his roles, which display shows a "weighting" associated with such roles. Questions area 1006 illustrates the use of query templates and navigation tips for finding and presenting related information without the user needing to type in a query via a query language such as IQL/EQL. Related entities area 1008, also supported by comprehensive NLP based searching and indexing, allows the user to navigate to other related information.

Figure 11A:
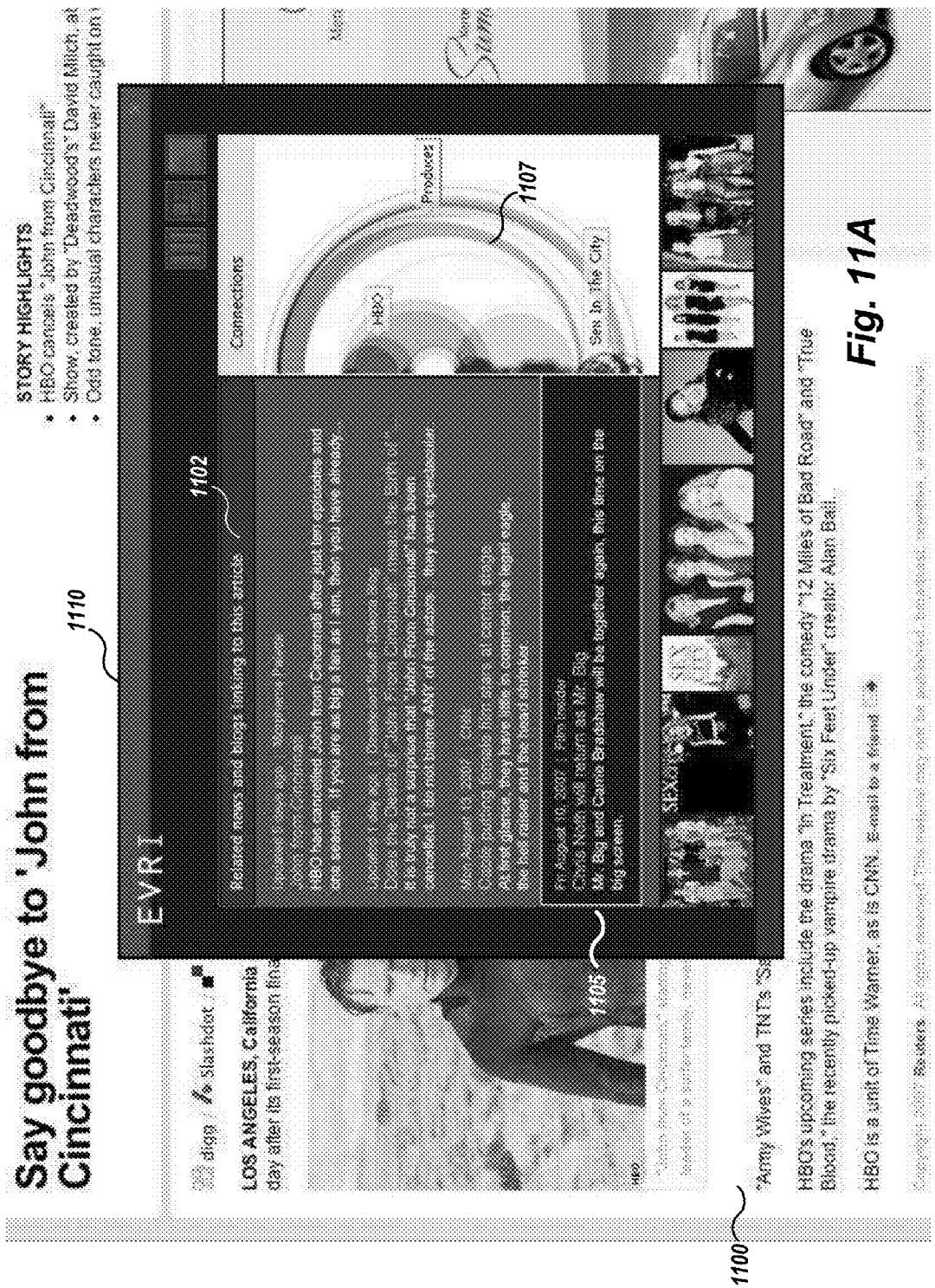
Figure 11B:
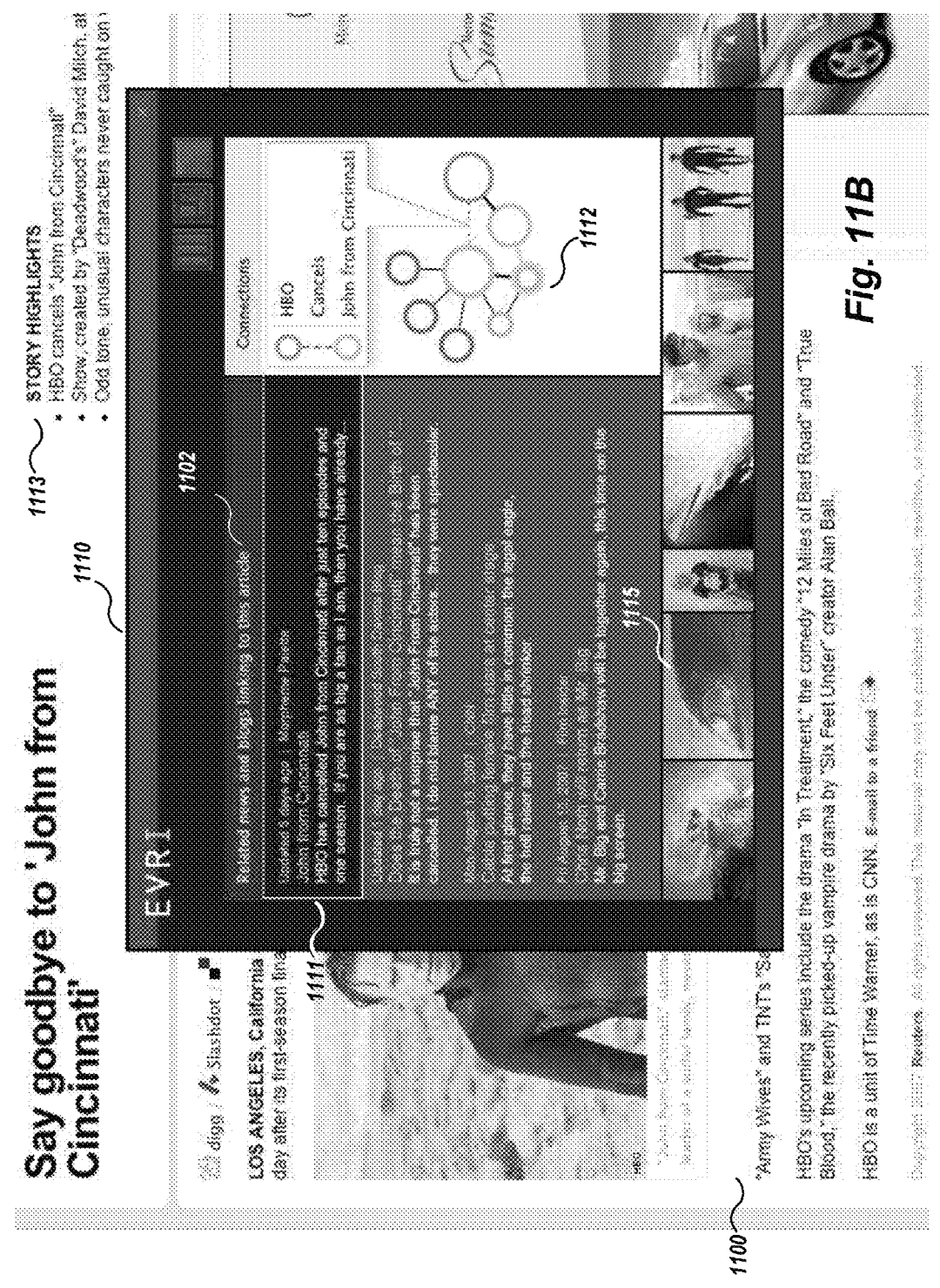
Figure 11C:

FIGS. 11A-11C illustrate another example NCR widget that combines some of the previously described textual and graphical presentations to present related and/or auxiliary information. For example, in FIG. 11A, the user is presented with an NCR widget 1110 displayed in the foreground of the underlying (news) content 1100. The widget presents a list 1102 with quick summaries of the most relevant similar articles to the underlying content 1100 along with a graphical representation of the "connections" (relationships) 1107 to entities that appear in the article 1105 selected from the related articles list 1102. FIG. 11B shows an alternative graphical representation of the connections 1112 derived from a selected article 1111 of articles list 1102. FIG. 11C is an illustration of an image 1120 rendered in response to user selection of image 1115 from a display of images. Text 1113 shows story highlights from selected article 1111.

Figure 12A:
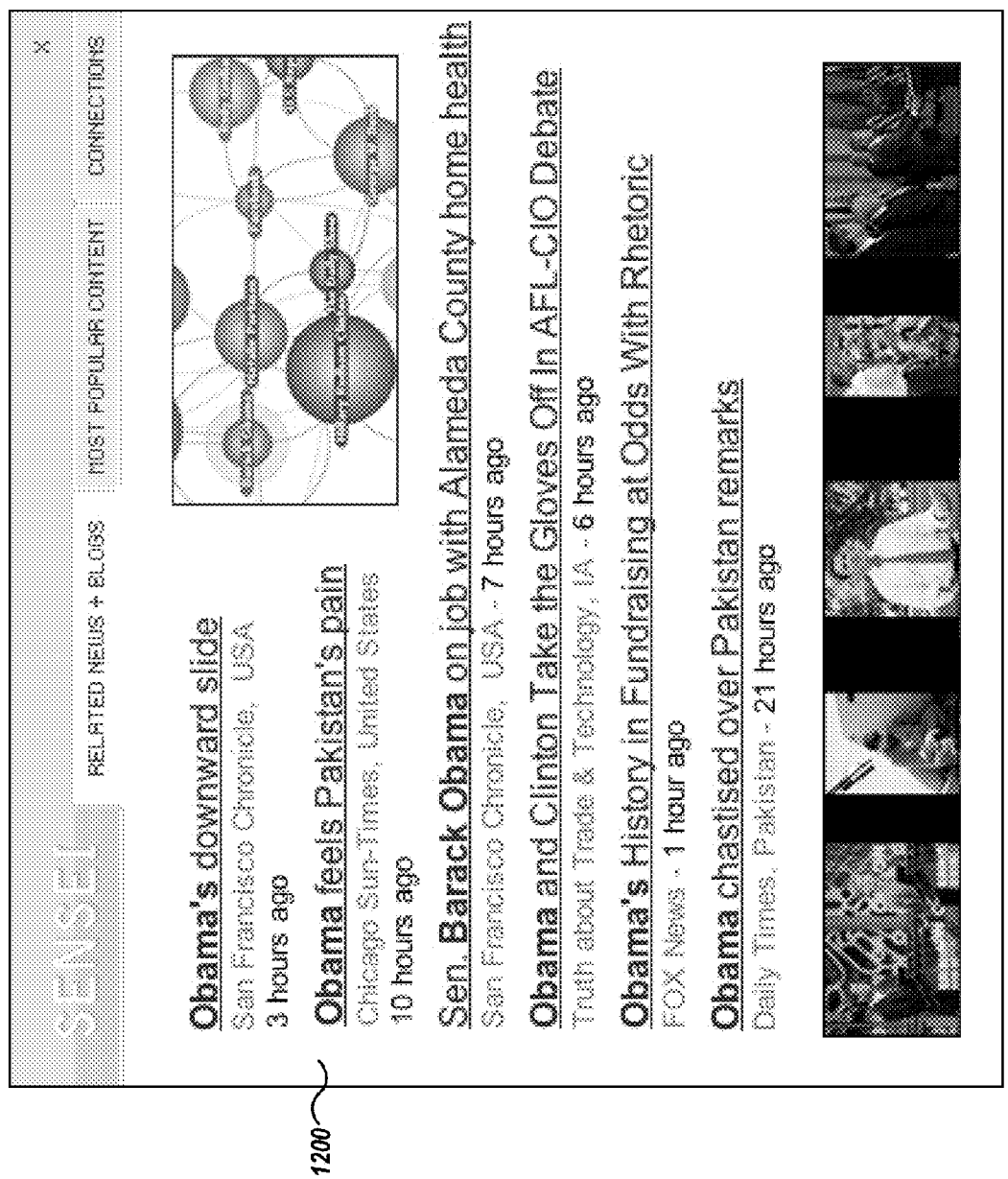
FIGS. 12A-12C illustrates another example NCR widget integrated into a website that provides links to news and blog information.
Figure 12B:
Figure 12C:
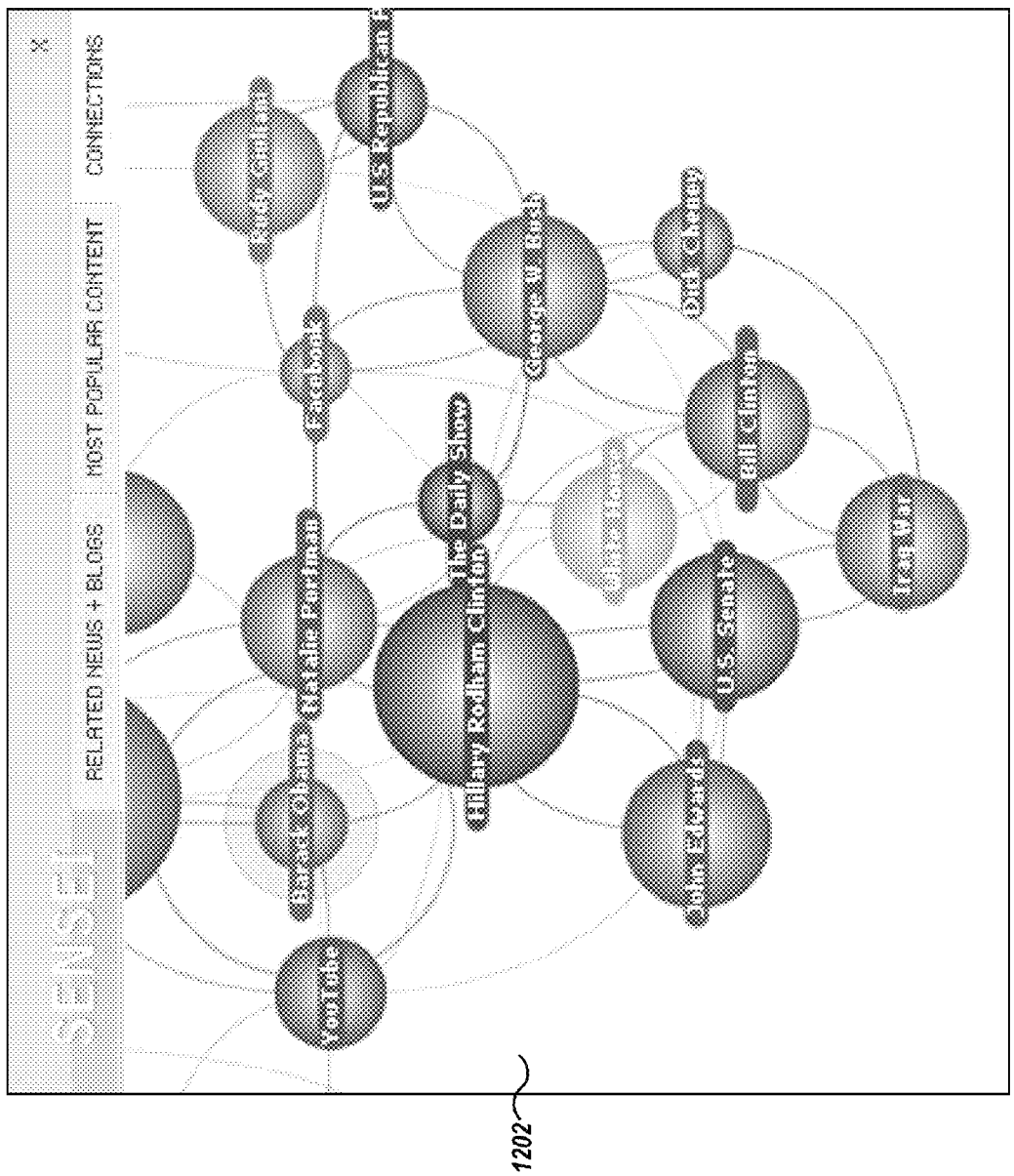

FIGS. 12A-12C illustrates another example NCR widget integrated into a website that provides links to news and blog information. The presentations of this NCR widget focus on timeliness and frequency concepts, and thus the various displays may be organized differently than might be presented elsewhere. For example, the article summary list 1200 displayed under the "Related News and Blogs" tab may be beneficial in social networking and/or blogging venues in that they are brief, list the source of the content, and the time when posted. In addition, in FIG. 12B, under the "Most Popular Content" tab, the entity names that appear in the most frequent news and blog postings are displayed with graphical indications according to their importance to and frequency found within the documents being searched (for example, in real time). For example some entities in list 1201 are presented in different size fonts, different colors, etc. FIG. 12C illustrates, under the "Connections" tab, a representation of the connections (relationships) 1202 that may be explored in the articles summarized in article summary list 1200. These connection nodes are the result of relationship queries on the underlying documents summarized in article summary list 1200.

Other representations for presenting recommended content by means of an NLP-Based Content Recommenders are also contemplated. It is notable that many such representations hide the power of the underlying relationship indexing and searching technology by giving the user simple navigation tools and hints for getting more information. Moreover, the information is determined, calculated, and presented in substantially real-time or near real-time, and may be dynamically updated periodically, or at specified intervals, or according to different schedules.

An NCR widget may be implemented using standard programming techniques that leverage the capabilities of a NLP-based processing engine that can perform indexing and relationship searching. It is to be understood that, although the interfaces illustrated in FIGS. 1B-12 are described as incorporating the powerful capabilities of NLP processing, less sophisticated searching techniques can also take advantage of the user interface designs of such widgets, tips, and user interface controls to the extent they are able to generate a portion of the content. For example, using a standard keyword search that pattern matches terms, some number of the entities referred to in an underlying article may be uncovered using frequency counts; however, to the extent the text is complex (and, for example, contains aliases, coreferences, pronouns, ambiguous nouns, etc.) it is not possible to confidently discover and subsequently list all of the named entities in the underlying document. To do this, the document must be "understood." Accordingly, the sophisticated and powerful natural language technology supporting the content recommenders described herein, can be used to achieve far improved results.

Also, although certain terms are used primarily herein, other terms could be used interchangeably to yield equivalent embodiments and examples. In addition, terms may have alternate spellings which may or may not be explicitly mentioned, and all such variations of terms are intended to be included. In addition, in the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 13:
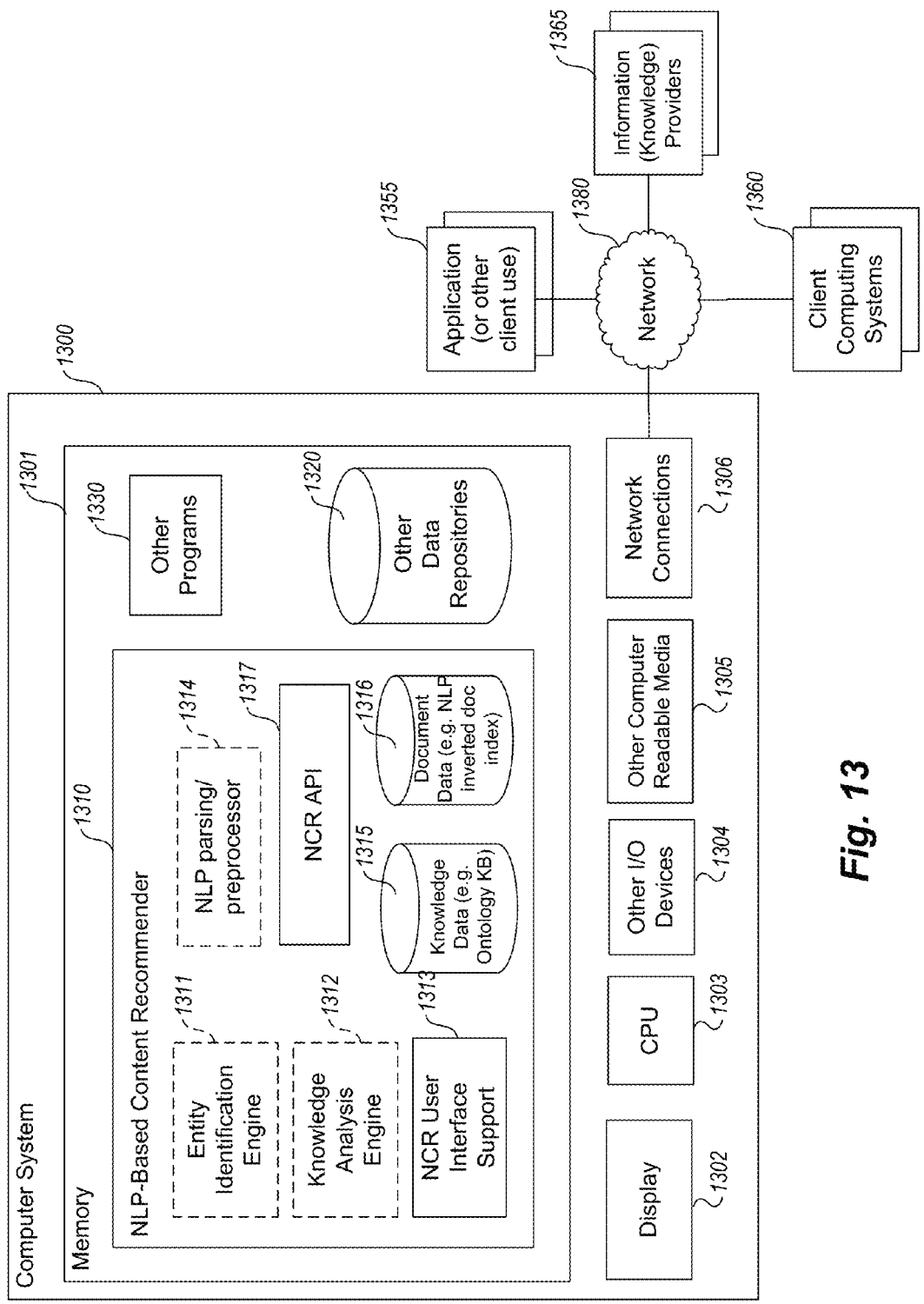
FIG. 13 is an example block diagram of an example computing system that may be used to practice embodiments of a NLP-Based Content Recommender.

FIG. 13 is an example block diagram of an example computing system that may be used to practice embodiments of a NLP-Based Content Recommender. Note that a general purpose or a special purpose computing system may be used to implement an NCR. Further, the NCR may be implemented in software, hardware, firmware, or in some combination to achieve the capabilities described herein.

Computing system 1300 may comprise one or more server and/or client computing systems and may span distributed locations. In addition, each block shown may represent one or more such blocks as appropriate to a specific embodiment or may be combined with other blocks. Moreover, the various blocks of the NCR 1310 may physically reside on one or more machines, which use standard (e.g., TCP/IP) or proprietary interprocess communication mechanisms to communicate with each other.

In the embodiment shown, computer system 1300 comprises a computer memory ("memory") 1301, a display 1302, one or more Central Processing Units ("CPU") 1303, Input/Output devices 1304 (e.g., keyboard, mouse, CRT or LCD display, etc.), other computer-readable media 1305, and network connections 1306. The NCR 1310 is shown residing in memory 1301. In other embodiments, some portion of the contents, some of, or all of the components of the NCR 1310 may be stored on and/or transmitted over the other computer-readable media 1305. The components of the NCR 1310 preferably execute on one or more CPUs 1303 and perform entity identification and present content recommendations, as described herein. Other code or programs 1330 and potentially other data repositories, such as data repository 1320, also reside in the memory 1301, and preferably execute on one or more CPUs 1303. Of note, one or more of the components in FIG. 13 may not be present in any particular implementation. For example, some embodiments embedded in other software may not provide means for other user input or display.

In one embodiment, the NCR 1310 includes an entity identification engine 1311, a knowledge analysis engine 1312, an NCR user interface support module 1313, an NLP parsing engine or preprocessor 1314, an NCR API 1317, a data repository (or interface thereto) for storing document NLP data 1316, and a knowledge data repository 1315, for example, an ontology index, for storing information from a multitude of internal and/or external sources. In at least some embodiments, one or more of the NLP parsing engine/preprocessor 1314, the entity identification engine 1311, and the knowledge analysis engine 1312 are provided external to the NCR and are available, potentially, over one or more networks 1380. Other and or different modules may be implemented. In addition, the NCR 1310 may interact via a network 1380 with applications or client code 1355 that uses results computed by the NCR 1310, one or more client computing systems 1360, and/or one or more third-party information provider systems 1365, such as purveyors of information used in knowledge data repository 1315. Also, of note, the knowledge data 1315 and the document data 1316 may be provided external to the NCR as well, for example, and be accessible over one or more networks 1380 to the NCR.

In an example embodiment, components/modules of the NCR 1310 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described use well-known or proprietary synchronous or asynchronous client-sever computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an NCR implementation.

In addition, programming interfaces to the data stored as part of the NCR 1310 (e.g., in the data repositories 1315 and 1316) can be made available by standard means such as through C, C++, C#, and Java APIs; libraries for accessing files, databases, or other data repositories; through scripting languages such as XML; or through Web servers, FTP servers, or other types of servers providing access to stored data. The data repositories 1315 and 1316 may be implemented as one or more database systems, file systems, or any other method known in the art for storing such information, or any combination of the above, including implementation using distributed computing techniques.

Also, the example NCR 1310 may be implemented in a distributed environment comprising multiple, even heterogeneous, computer systems and networks. For example, in one embodiment, the modules 1311-1314, and 1317, and the data repositories 1315 and 1316 are all located in physically different computer systems. In another embodiment, various modules of the NCR 1310 are hosted each on a separate server machine and may be remotely located from the tables which are stored in the data repositories 1315 and 1316. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.). Other variations are possible. Also, other functionality could be provided by each component/module, or existing functionality could be distributed amongst the components/modules in different ways, yet still achieve the functions of an NCR.

Furthermore, in some embodiments, some or all of the components of the NCR may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be transmitted as contents of generated data signals (e.g., by being encoded as part of a carrier wave or otherwise included as part of an analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/999,559, entitled "NLP-BASED CONTENT RECOMMENDER," filed Oct. 17, 2007, and U.S. application Ser. No. 12/288,347, entitled NLP-BASED CONTENT RECOMMENDER," filed Oct. 16, 2008, are incorporated herein by reference, in their entireties.

From the foregoing it will be appreciated that, although specific embodiments have been described herein for purposes of illustration, various modifications may be made without deviating from the spirit and scope of this disclosure. For example, the methods, techniques, and systems for entity recognition and disambiguation are applicable to other architectures other than a Web-based architecture. For example, other systems that are programmed to perform natural language processing can be employed. Also, the methods, techniques, and systems discussed herein are applicable to differing query languages, protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method for providing natural language based content recommendations, comprising:
    receiving an indication of text content;
    processing the indicated text content using natural language processing ("NLP") parsing and linguistic analysis to derive a list of named entities present in the indicated text;
    presenting an ordered list of the derived named entities, the list reflective of what the text content concerns; and
    presenting indicators of additional content associated with the derived named entities wherein the additional content is provided upon receiving an indication that at least one of the presented indicators has been navigated to, and wherein additional content is determined as relevant based upon a natural language processing analysis of the derived named entities relative to the indicated text content and of the derived named entities relative to a larger corpus of document information or a knowledge repository, wherein the additional content includes a representation of connections to at least one named entity, and wherein the additional content is determined as relevant using context information associated with the derived named entities.

2. The method of claim 1 wherein the presented indicators are at least one of text, graphical indicators, symbols, icons, links, hyperlinks, or hypertext.

3. The method of claim 1 wherein the additional content is determined using a search of an ontology knowledge repository.

4. The method of claim 1 provided by at least one of a downloadable widget or a plug-in.

5. The method of claim 1 accessible by a user interface control embedded on a web page.

6. The method of claim 1 accessible by a user interface control implemented as a browser plug-in.

7. The method of claim 1 wherein the additional content includes a representation of connections.

8. The method of claim 7 wherein the connections are derived using NLP-based relationship searches based upon one or more of the derived named entities.

9. The method of claim 7 wherein the connections are presented graphically.

10. A non-transitory computer-readable medium containing content that, when executed, causes a computing system to perform a method comprising:
    receiving an indication of text content;
    processing the indicated text content using natural language processing (NLP) parsing and linguistic analysis to derive a list of named entities present in the indicated text;
    presenting an ordered list of the derived named entities, the list reflective of what the text content concerns; and
    presenting indicators of recommended content associated with the derived named entities wherein the recommended content is provided upon receiving an indication that at least one of the presented indicators has been navigated to, and wherein the recommended content is determined as relevant based upon a natural language processing analysis of the derived named entities relative to the indicated text content and of the derived named entities relative to a larger corpus of document information or a knowledge repository, wherein the recommended content includes a representation of connections to at least one derived named entity, and wherein the additional content is determined as relevant using context information associated with the derived named entities.

11. The computer-readable medium of claim 10, wherein the medium is a memory in a computing system.

12. The computer-readable medium of claim 10 wherein the contents are instructions that, when executed, cause a computer processor in the computing device to perform the method.

13. A computer-implemented NLP-based content recommendation system, comprising:
   a memory; and
   a content recommender module, having instructions that are configured to, when executed,
   receive a text segment for processing;
   identify, one or more named entities to which a received text segment refers based, at least in part, upon a natural language processing (NLP) parsing and linguistic analysis of the text segment; and
   derive and present related content based at least in part upon a natural language processing parsing and linguistic analysis of entity based information and of context related information, wherein the related content includes a representation of connections to at least one identified named entity, and wherein the related content is determined as relevant using context information associated with the derived named entities.

14. The system of claim 13, wherein the module is further configured, when executed, to display one or more indicators for navigating to the related content.

15. The system of claim 14 wherein the module is further configured, when executed, to present the related content in response to detecting selection of at least one of the navigation indicators.

16. The system of claim 14 wherein the indicators are links.

17. The system of claim 14 wherein the indicators are at least one of graphical symbols, icons, shapes, logos, or trademarks.

18. The system of claim 14 wherein the natural language processing parsing and linguistic analysis is initiated using a natural language query.

19. The system of claim 18 wherein the natural language query is a relationship search query.

* * * * *